United States Patent [19]
Whiting et al.

[11] Patent Number: 5,965,998
[45] Date of Patent: Oct. 12, 1999

[54] AUTOMATIC POLARITY AND CONDITION SENSING BATTERY CHARGER

[75] Inventors: John S. Whiting, Plymouth; Chris C. Dickey, West St. Paul, both of Minn.

[73] Assignee: Century Mfg. Co., Minneapolis, Minn.

[21] Appl. No.: 08/675,383

[22] Filed: Jul. 2, 1996

[51] Int. Cl.⁶ ........................................................ H02J 7/00
[52] U.S. Cl. .................................. 320/165; 320/DIG. 15
[58] Field of Search .................................. 320/25, 30, 31, 320/26, 57, 61, 165, DIG. 15; 323/906

[56] References Cited

U.S. PATENT DOCUMENTS

| | | |
|---|---|---|
| 3,118,101 | 1/1964 | Arber . |
| 3,413,487 | 11/1968 | Gershen . |
| 3,593,101 | 7/1971 | Wassink . |
| 4,400,658 | 8/1983 | Yates . |
| 4,663,579 | 5/1987 | Yang . |
| 4,740,740 | 4/1988 | Taranto et al. . |
| 4,757,250 | 7/1988 | Guim et al. ................................ 320/25 |
| 4,769,586 | 9/1988 | Kazmierowicz . |
| 4,855,662 | 8/1989 | Yang . |
| 4,876,496 | 10/1989 | Duncan . |
| 4,972,135 | 11/1990 | Bates et al. . |
| 4,994,727 | 2/1991 | Yang . |
| 5,103,155 | 4/1992 | Joannou . |
| 5,136,620 | 8/1992 | Eaves ......................................... 377/15 |
| 5,189,359 | 2/1993 | Kronberg . |
| 5,341,082 | 8/1994 | Lorenzen et al. ............................ 320/9 |
| 5,371,455 | 12/1994 | Chen . |

Primary Examiner—Peter S. Wong
Assistant Examiner—Gregory J. Toatley, Jr.

[57] ABSTRACT

The present invention discloses a battery charging device adapted to be connected to a battery having a positive and a negative terminal for supplying a direct current to the positive terminal of the battery. This device comprises an alternating current supply means, such as a transformer, connected to a power supply for providing alternating current, such as a wall socket. A charge current supply controller means is connected to the secondary winding of the transformer. The charge current supply controller means comprises two pairs of silicon controlled rectifiers ("SCR") and a SCR interface circuit. The secondary of the transformer is also connected to the SCRs. A processor which is connected to the SCR interface circuit determines which pair of SCRs will supply direct current to the battery. The processor, which is connected to the output of the polarity sensing detector, decides which pair of SCRs will be the conduit for the current to the battery based on the output of the polarity sensing detector. The polarity sensing detector is in communication with the battery. The SCRs are adapted to be connected to the positive and negative terminals of the battery for supplying direct current to the positive terminal of the battery.

Once the polarity of the connection has been determined and the direct current will flow to the positive terminal of the battery, the processor utilizes software to determine whether a battery can accept charge.

12 Claims, 19 Drawing Sheets

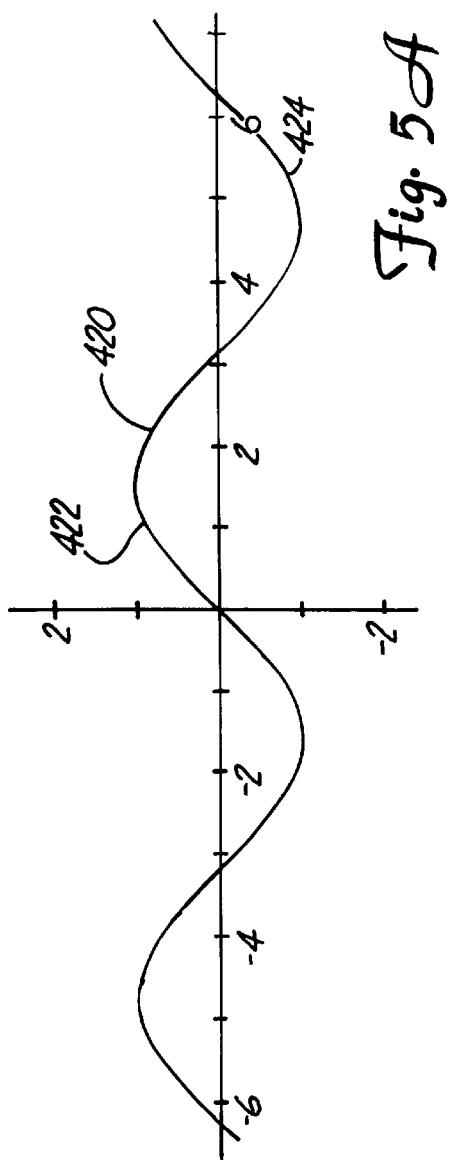
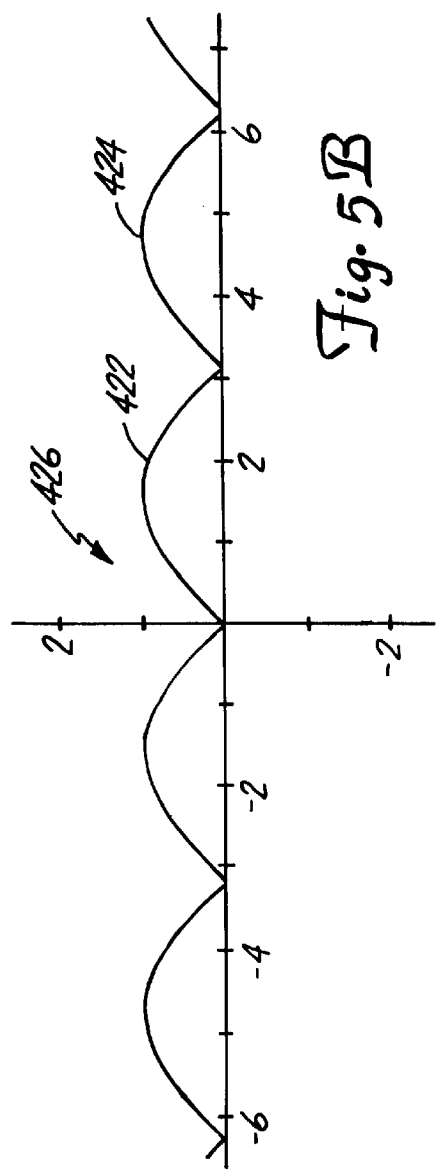

LOOK-UP TABLE FOR CHARGER CONTROLLER

| OUTPUTS | A VOLTS/HOUR | B (VOLTS) LESS THAN | GREATER THAN | C V GREATER THAN | D V ON V OFF >x (VOLTS) | E dv/dt <x (v/hr) | F Vave >x (volts) | G d²V/dt²>x | H Vave >x (volts) | I dV/dt >x (v/hr) | J Time >x (hours) | K |
|---|---|---|---|---|---|---|---|---|---|---|---|---|
| 12v 15A | 3 | 17.0 | 14.6 | 17.5 | 3.0 | -1.00 | 14.6 | 0 | 16.5 | 0.05 | 12 | 1/3 |
| 12v 2A | 1 | 16.0 | 14.0 | 16.0 | 2.0 | -0.50 | 14.0 | 0 | 15.0 | 0.02 | 24 | 1/2 |
| 12v 14A DEEP CYCLE | 3 | 17.0 | 14.6 | 17.5 | 3.0 | -1.00 | 14.6 | 0 | 16.5 | 0.05 | 12 | 1/2.7 |
| 12v 2A DEEP CYCLE | 1 | 16.0 | 14.0 | 16.0 | 2.0 | -0.50 | 14.0 | 0 | 15.0 | 0.05 | 24 | 1/1.8 |
| 6V 15A | 1.5 | 8.0 | 7.0 | 9.0 | 1.5 | -0.50 | 7.0 | 0 | 8.0 | 0.02 | 12 | 1/3 |
| 6V 2A | 0.5 | 8.0 | 6.5 | 9.0 | 1.0 | -0.25 | 7.0 | 0 | 7.0 | 0.01 | 24 | 1/2 |
| ENGINE START | 100 | 21 | 20 | 20.0 | 3.0 | -100.0 | 20.0 | 0 | 20 | 0 | 0.08 | 0 |

Fig. 15

AUTOMATIC POLARITY AND CONDITION SENSING BATTERY CHARGER

TECHNICAL FIELD

The present invention relates generally to a current supplying device for charging a battery. More particularly, the present invention discloses a direct current supplying device that (1) protects the battery in the event that it is inadvertently connected to the battery charger with the wrong polarity; and (2) saves energy by determining if the battery connected to the charger is capable of being charged and turning itself off when the battery is fully charged.

BACKGROUND OF THE INVENTION

Many devices such as automobiles, boats, motorcycles, agricultural machines, and some spare power supply systems use a battery which is rechargeable. Sometimes, the electric power stored in these rechargeable batteries is depleted, and the battery must be recharged. Battery chargers which are used to recharge a battery are well known devices. Such chargers supply direct current to the positive terminal of an energy depleted battery. Generally, the battery chargers include an alternating current ("AC") to direct current ("DC") converter for generating a direct current from an AC household power supply. The chargers also include red and black attachment cables for connecting the charger to the depleted battery. When connecting the charger to the battery, the red cable must be connected to the positive terminal of the battery, and the black cable must be connected to the negative terminal of the battery or to a ground so that the direct current is supplied to the positive terminal of the battery.

If the red and black cables are reversed and not properly connected to the battery terminals, then the battery charger will supply the direct current to the negative terminal of the battery. This situation can result in overheating of the battery charger, excess arcing between the connection cables and the terminals of the battery, and, in extreme cases, battery explosions.

Currently, there are battery chargers which are able to detect polarity (e.g. U.S. Pat. No. 4,876,496 to Duncan). However, present devices can only detect polarity if the battery has a minimum voltage greater than 7.2 volts and are not effective in determining polarity of a depleted battery having a voltage of less than 7.2 volts. Clearly, a polarity sensing feature in a battery charger which can sense the polarity for a battery having any voltage greater than zero volts would protect over a greater range of situations.

Also, there are batteries which cannot be recharged because the battery has been (1) sulfated; (2) previously, negatively charged; or (3) frozen. These batteries need to be replaced. Currently, battery chargers do not have the capability to determine if a battery is accepting any charge. Without such a feature, hours of electrical energy may be wasted trying to charge a "dead" battery. A battery charger which can determine whether a battery can accept charge is desirable.

Also, currently, battery chargers continue to supply current to the positive terminal of a battery as long as the battery charger is connected to an AC outlet and the battery is connected to the battery charger. Overcharging a battery can damage the battery or limit its life. Thus, it is important to know when the battery has been fully charged. Moreover, in order to save energy, it would be more efficient if the battery charger would stop supplying current once the battery has been fully charged. Thus, a battery charger which will stop supplying current to the battery when it is fully charged is desirable.

Finally, some battery chargers do determine whether a battery is fully charged. However, these chargers make this determination based on detecting a decrease in the rate of change in voltage over time. This method is flawed for two reasons: (1) a slow change in voltage could be indicative of a frozen or negatively charged battery; and (2) this method does not ensure that the battery is fully charged. A battery charger which can determine if a battery is fully charged before turning off the current would be useful.

SUMMARY OF THE INVENTION

The present invention discloses a battery charging device adapted to be connected to a battery having a positive and a negative terminal for supplying a direct current to the positive terminal of the battery. This device comprises an alternating current supply, such as a transformer, connected to an external power supply for providing alternating current, such as a wall socket. A charge current supply controller is connected to the secondary winding of the transformer. The charge current supply controller comprises two pairs of silicon controlled rectifiers ("SCR") and a SCR interface circuit. The secondary of the transformer is also connected to the SCRs. A processor which is connected to the SCR interface circuit determines which pair of SCRs will supply direct current to the battery. The processor, which is connected to the output of the polarity sensing detector, decides which pair of SCRs will be the conduit for the current to the battery based on the output of the polarity sensing detector. The polarity sensing detector is in communication with the battery. The SCRs are adapted to be connected to the positive and negative terminals of the battery for supplying direct current to the positive terminal of the battery. The polarity sensing detector can determine the configuration of the polarity at the attachment cables as long as the voltage of the battery is greater than zero.

Once the polarity of the connection has been determined and the direct current is flowing to the positive terminal of the battery, the processor utilizes software to determine whether a battery can accept charge. In particular, while the battery is being charged or if the current is being supplied for engine start, the processor monitors the voltage of the battery for a period of time, performs certain calculations, and compares the results to values in a look-up table. Based on the comparisons, the charger will shut down, if the results of the comparisons indicate that the battery is not accepting charge. In particular the software is designed to detect sulfated batteries, negatively charged batteries, frozen batteries, and fully charged batteries at the time the charger is connected to the battery. The values in the look-up table are based on experimental values derived from the behavior of various automotive and deep cycle batteries.

Also, when the charger is supplying current to the battery, the battery charger of the present invention monitors the battery to determine if it is fully charged. The charger determines whether the battery has been fully charged. The charger makes this determination by performing the following steps: (1) it determines whether the battery voltage is greater than a minimum voltage level provided by in the look-up table; and (2) it detects whether the acceleration of the voltage charge with respect to time is decreasing so that the battery voltage has crossed an inflection point on a battery charging voltage curve.

If both these conditions are met, then the charger determines that the battery is fully charged. It then continues to supply current to the battery for a period of time, which is based on the amount of time the charger had to supply current for the charger to determine the battery was fully charged. This additional time that the battery is supplied current is to complete the charge.

An object of the present invention is to provide a battery charger with the capability to automatically detect the polarity of the battery cables and supply current to the positive terminal of the battery.

Another object of the present invention is to detect abnormal battery conditions (i.e., a battery that is sulfated, negatively charged, or frozen).

A further object of the present invention is to determine when a battery is fully charged, and then shut off the current supply to the battery.

The above objects, advantages, and features of the present invention will become more apparent upon reference to the following description thereof with the appended drawings. However, before referring to the description and to the drawings, it is to be appreciated that the following description shows the presently preferred embodiments only. Accordingly, various modifications may be made to the invention without departing from the spirit and scope of the following described invention. It is to be further appreciated that to the extent like numerals are used in the various drawings, they describe like components.

BRIEF DESCRIPTION OF THE DRAWINGS

FIGS. 5A–5B show waveforms representing AC current and rectified AC current, respectively.

FIG. 15 illustrates a Look-Up Table utilized by the processor to determine whether a battery can accept charge.

DETAILED DESCRIPTION OF THE PREFERRED EMBODIMENT

General Overview

Figure 1:
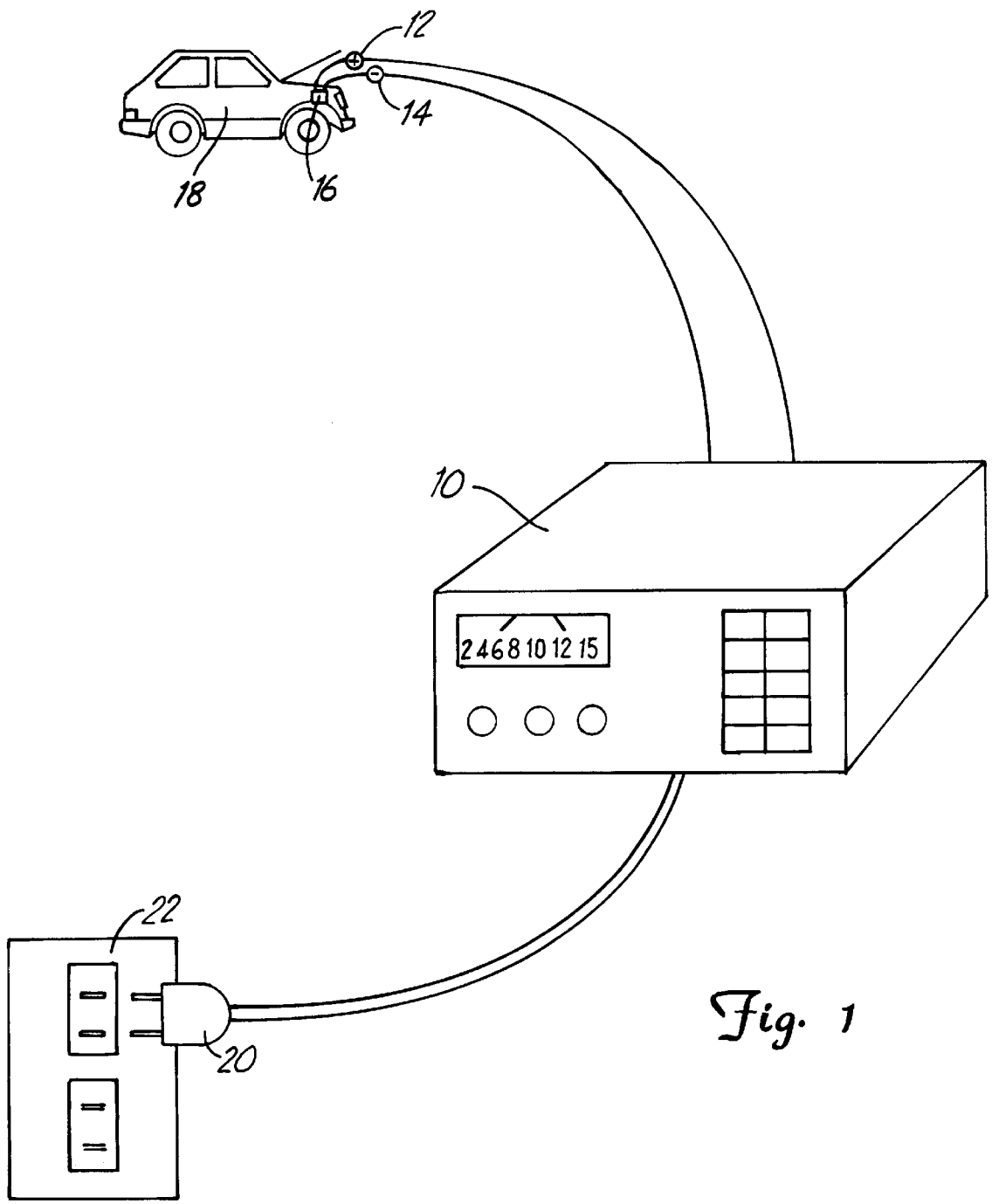
FIG. 1 shows a battery charger of the present invention connected to a car battery and plugged into a wall socket.

FIG. 1 shows the battery charging device or battery charger 10 of the present invention having a pair of attachment cables 12, 14, one being a nominal positive cable 12 and the other being a nominal negative cable 14, which extend from the battery charger 10. In use, the attachment cables 12, 14 are connected to a battery 16, which may be a battery 16 for a car 18. The battery charger 10 has a plug 20 which may be connected to a power source such as a wall socket 22 to supply alternating current ("AC current") to the battery charger 10.

When the attachment cables 12, 14 are connected to the terminals of the battery 16 and the battery charger 10 is connected to an AC power source, the battery charger (1) determines the polarity configuration of the attachment cables 12, 14 at the battery terminals; (2) automatically chooses a conduit so that the direct current is supplied to the positive terminal of the battery 16, regardless of the polarity configuration of the attachment cables 12, 14 at the battery terminals; (3) determines whether the battery 16 connected to the battery charger device 10 can accept charge; and (4) as charging proceeds, determines when the battery is fully charged and then continues to supply current for a period of time to ensure that it is completely charged. Thus, regardless of how the attachment cables 12, 14 are connected to the battery 16, the battery charger of the present invention will safely charge the battery 16. Also, the battery charger 10 will determine whether the battery 16 can accept charge (shutting down, if it cannot), thereby, saving energy. Moreover, the battery charger 10 has the capability to determine when a battery is fully charged, then to charge for a period of time to "top it off" and, finally, to shut off the current to the battery so that the battery will not be overcharged. Furthermore, the battery charger 10 of the present invention saves energy by carefully limiting the amount of time a battery 16 will be charged.

Block Diagram Descriptions

Figure 2:
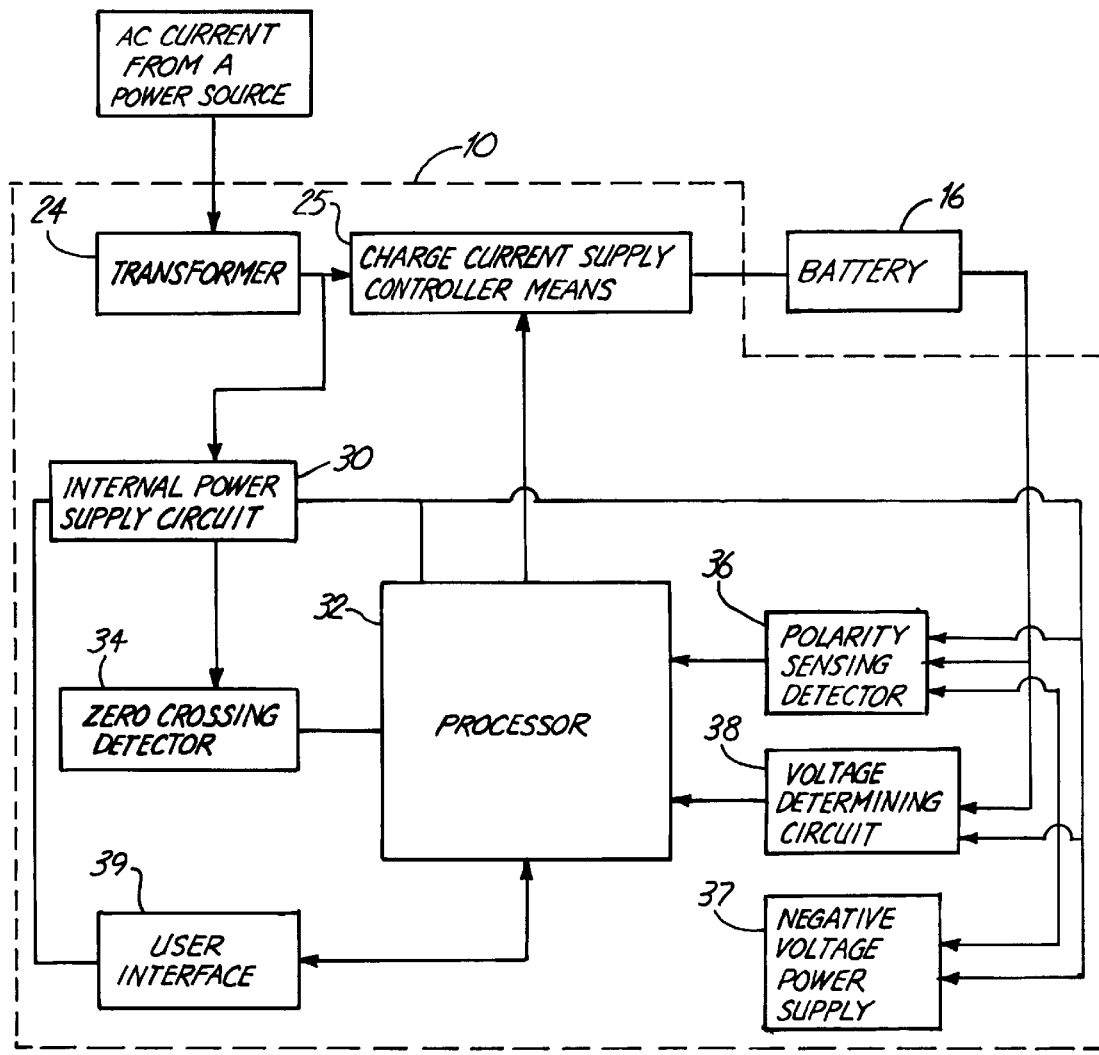
FIG. 2 is a block diagram of the various components of the present invention.
Figure 3:
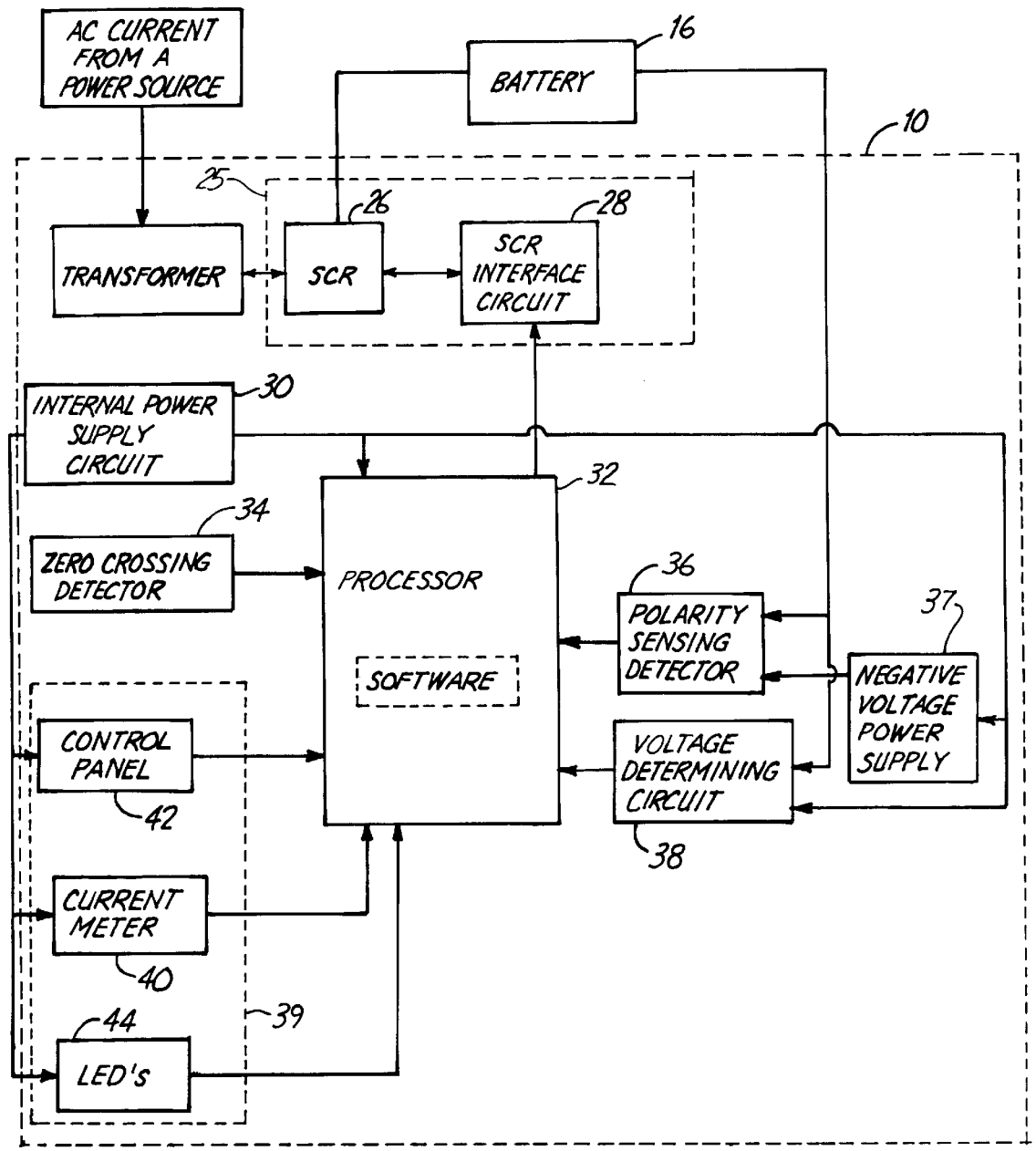
FIG. 3 is a block diagram of the various components of the present invention.
Figure 4:
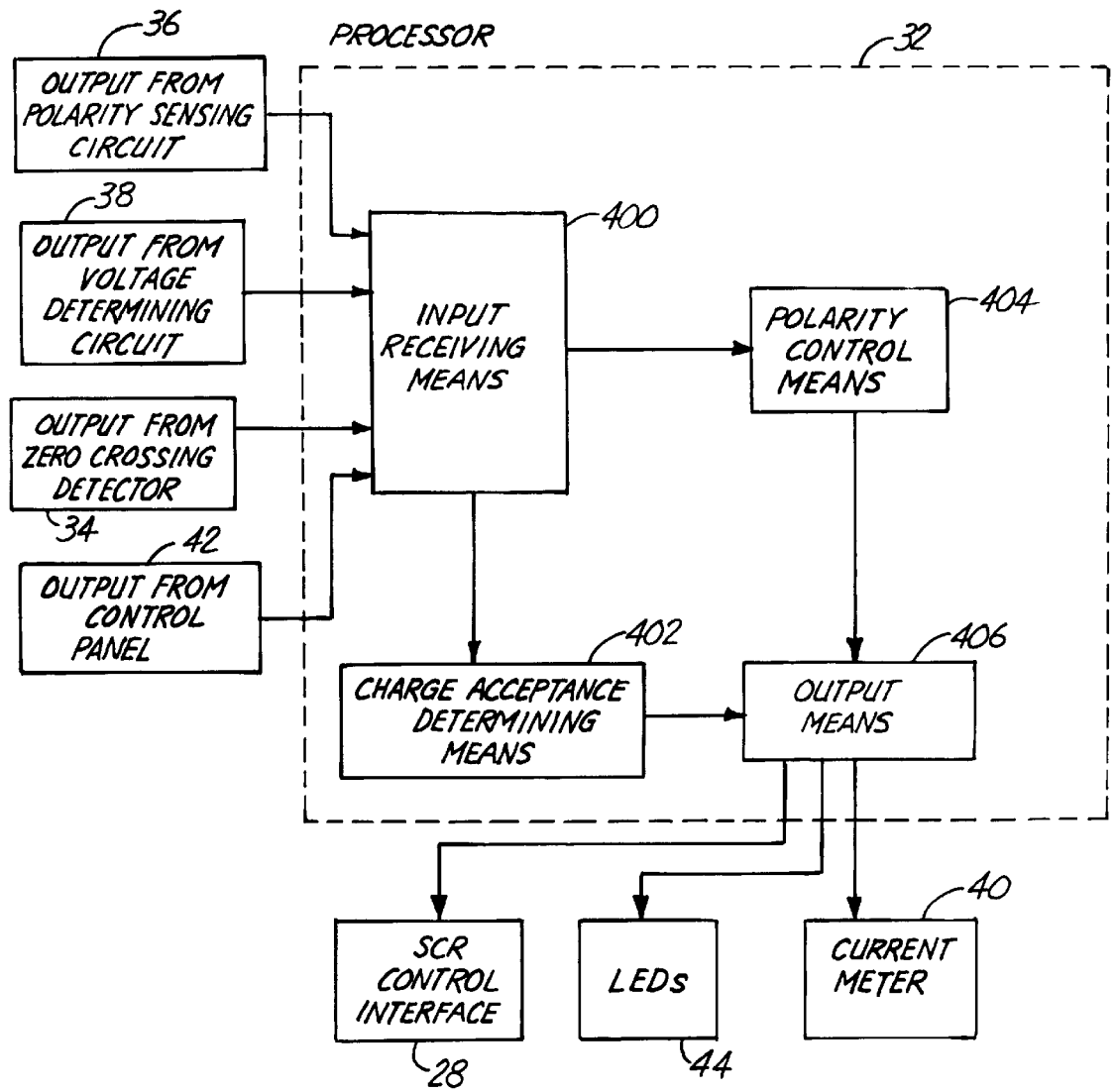
FIG. 4 is a block diagram indicating some of the functions performed by the processor.

With reference to FIGS. 2–4, the various components of the battery charger device 10 and their interconnections and functions will be explained. FIG. 2 is a block diagram illustrating the various circuits and components of the battery charger device 10 and their relationships to each other. The battery charger device 10 comprises a transformer 24 having primary and a secondary winding, a charge current supply controller means 25, an internal power supply circuit 30, a data processor 32 (such as a Z86C33 microprocessor made by Zilog Corporation), a zero crossing detector 34, a polarity sensing detector 36, a negative voltage power supply 37, a voltage determining circuit 38, and a user interface 39. The transformer 24 is connected to an AC power source such as wall socket 22. The transformer 24 outputs via its secondary winding an alternating current which is rectified by downstream components. The resulting direct current (DC) is used to charge the battery 16 and to supply power internally to the various components of the battery charger 10.

The transformer's output is connected to the internal power supply circuit 30 and the charge current supply controller means 25. The internal power supply circuit 30 is connected to all circuit components of the battery charger 10 that require power.

The charge current supply controller means 25 is connected to the battery 16 and the processor 32. The zero crossing detector 34, the polarity sensing detector 36, the voltage determining circuit 38, and the user interface 39 are all connected to the processor 32. The negative voltage power supply 37 provides a negative voltage to the polarity sensing detector 36 for reasons which will be explained later.

In operation, AC current is supplied to the transformer 24, which outputs AC current to the internal power supply circuit 30 and the charge current supply controller means 25. The internal power supply circuit 30 rectifies the AC current and provides components of the various circuits with power. In addition, the full wave rectified DC current provided by the internal power supply circuit 30 is used by the zero crossing detector 34 to allow the processor 32 to control the voltage and current supplied to the battery 16.

The user interface 39, which is connected to the processor 32, allows the user to select various options including: (1)

specifying the voltage of the battery to be charged, (2) specifying the rate of flow of the charge current, and (3) selecting an engine start as opposed to charging a battery. In the engine start mode, the battery charger 10 enables the engine in which the battery is installed to be jump-started. Also, the user interface 39 is used by the processor 32 to communicate to the user information regarding whether the charger 10 is properly connected to the battery 16, whether the charge is complete, and whether the battery can be charged.

The polarity detector circuit 36 determines the polarity of the attachment cables 12, 14 attached to the battery 16. These cables 12, 14 extend from the charge current supply controller means 25 to terminals of the battery 16. The negative voltage power supply 37 provides a negative voltage threshold to detector 36 which allows the polarity sensing detector 36 to determine whether the attachment cables 12, 14 have been connected to the terminals of the battery 16 with their nominal polarity reversed. The output from the polarity sensing detector 36 is an input into the processor 32.

Once the processor 32 has determined the polarity via the polarity sensing detector 36, the processor 32 causes the alternating current, which is rectified in the charge current supply controller means 25, to be supplied to the positive terminal of the battery 16.

The voltage determining circuit 38 senses the absolute value of the voltage of the battery 16. This data is used by the processor 32 to determine whether the battery 16 can accept charge.

FIG. 3 is a block diagram which illustrates in more detail the components of the charge supply controller means 25 and the components of the user interface 39 and the relationship of each to the other components of the battery charger 10. The charge supply controller means 25 comprises SCRs in SCR group 26 and an SCR interface circuit 28. The output of the transformer 24, which is an AC current, is connected to the SCR group 26. The output of the SCR group 26 via the attachment cables 12, 14 are connected to the terminals of the battery 16. The processor 32 controls the SCR group 26 via the SCR interface circuit 28, which is interposed between the SCR group 26 and the processor 32.

In operation, the AC current output from the transformer 24 is input to the SCR group 26. Each SCR in group 26 rectifies the AC current to DC current. Based on the output of the polarity sensing circuit 36, the processor 32 via the SCR interface circuit 28 determines which SCRs in SCR group 26 will be enabled to supply direct current to the positive terminal of the battery 16.

The user interface comprises a current meter 40, a control panel 42, and visual indicators, such as light emitting diodes (LEDs) 44. Using the control panel 42, the user selects from several options including: (1) specify the battery voltage of the battery to be charged (6 volts ("V") or 12 V), (2) specify the rate of the charge current (2 or 15 amperes ("amps")), and (3) select an engine start as opposed to charging a battery. When engine start is selected, seventy (70) amps is supplied to the battery 16 for up to a two (2) minute period.

Based on the information received from the voltage determining circuit 38, the polarity detector circuit 36, the zero crossing detector 30, the control panel 42, and the processor 32 executing software described in detail later, (1) selects the SCRs 28 through which current will be supplied to the battery 16; (2) controls the amount of current supplied to the battery; (3) determines whether the battery 16 can accept charge; (4) stops attempting to supply current to the battery if the battery is not accepting the current; (5) indicates via the current meter 40 the amount of current being supplied to the battery 16; (6) determines if the battery is fully charged, then supplies current for a period of time to complete the charge; and (7) indicates via the LEDs 44 whether (a) the attachment cables have been connected to the battery; (b) the charge is complete; and (c) the battery is able to accept a charge.

As indicated in FIG. 3, the processor 32 uses software to control the operation of the battery charger 10. FIG. 4 is a block diagram showing generally the functions performed by the processor 32. The processor 32 has input receiving means 400 through which the outputs from the control panel 42, the polarity sensing detector 36, the voltage determining circuit 38, and the zero crossing detector 40 are received. The processor 32 uses the data from the control panel 42, the polarity sensing detector 36, and the zero crossing detector 40 to control, via output means 406, the amount of current and voltage as well as the path of the current supplied to the battery by sending control signals to the SCR control interface 28. The processor then monitors the charging of the battery 16 and uses the data from the voltage determining circuit to determine whether (1) the battery 16 is able to accept a charge and (2) whether the battery is fully charged. If the battery 16 is not able to accept a charge, the charger 10 shuts itself off. When the battery is fully charged, then the charger 10 continues to supply current to the battery for a period of time to complete the charge. The output means 406 is also used by the processor 32 to indicate to the user via the LEDs (1) that the attachment cables 12, 14 have been properly connected to the battery 16; (2) that the battery cannot be charged; or (3) that the charge is complete.

Next, turning to FIGS. 5–11, the detailed implementation of the present invention for a battery charger 10 which (1) automatically detects polarity of the cables 12, 14 when attached to a battery 16, (2) determines whether a battery 16 is accepting charge properly, and (3) determines whether a battery 16 is fully charged will be described.

Internal Power Supply

Figure 5:
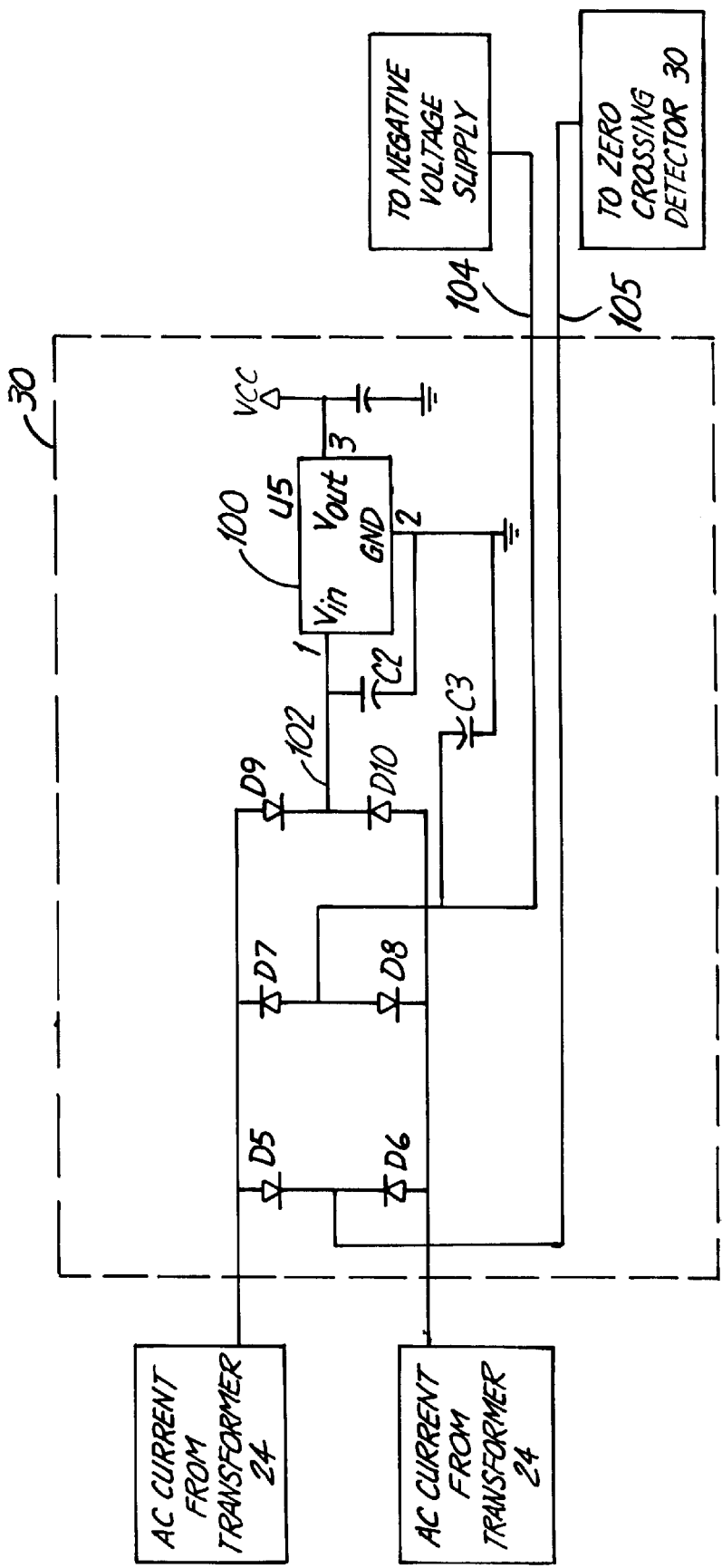
FIG. 5 shows an internal power supply circuit.

First, referring to FIG. 5, the internal power supply circuit 30 is illustrated. The internal power supply circuit 30 comprises six diodes D5–D10, three capacitors C2–C4, and a regulator 100. The diodes D7, D8, D9, D10 are configured as a standard full wave bridge rectifier. This bridge rectifier D7–D10 is connected to the secondary of the transformer 24. The output from the diodes D7, D8, D9, D10 is a full wave rectification of the AC current input into the bridge. This rectified output is input via line 102 into the regulator 100 and via line 104 to the negative voltage supply circuit. Diodes D5 and D6 are also used to rectify the AC current from the secondary of the transformer 24 for the zero crossing detector 34 which will be described later in this specification. The regulator 100 regulates the rectified plus viable DC current to supply the various components of the present invention.

In operation, AC current from the transformer 24 is input to diodes D5–D10. FIG. 5A illustrates a waveform 420 that represents AC current. As shown in FIG. 5A, the waveform 420 has a positive portion 422 and a negative portion 424. These diodes fully rectify the AC current to provide DC current. FIG. 5B shows a rectified waveform 426. As shown in FIG. 5B, in the rectified waveform 426, the positive portion 422 remains the same but the negative portion 424 inverted over so that the negative portion 421 is also on the positive side. The regulator 100 then regulates this rectified DC current to supply a plus 5 volt DC to various components. The rectified AC current from diodes D5 and D6 via line 105 is input to zero crossing detector 30.

SCR Group and SCR Interface

Figure 6:
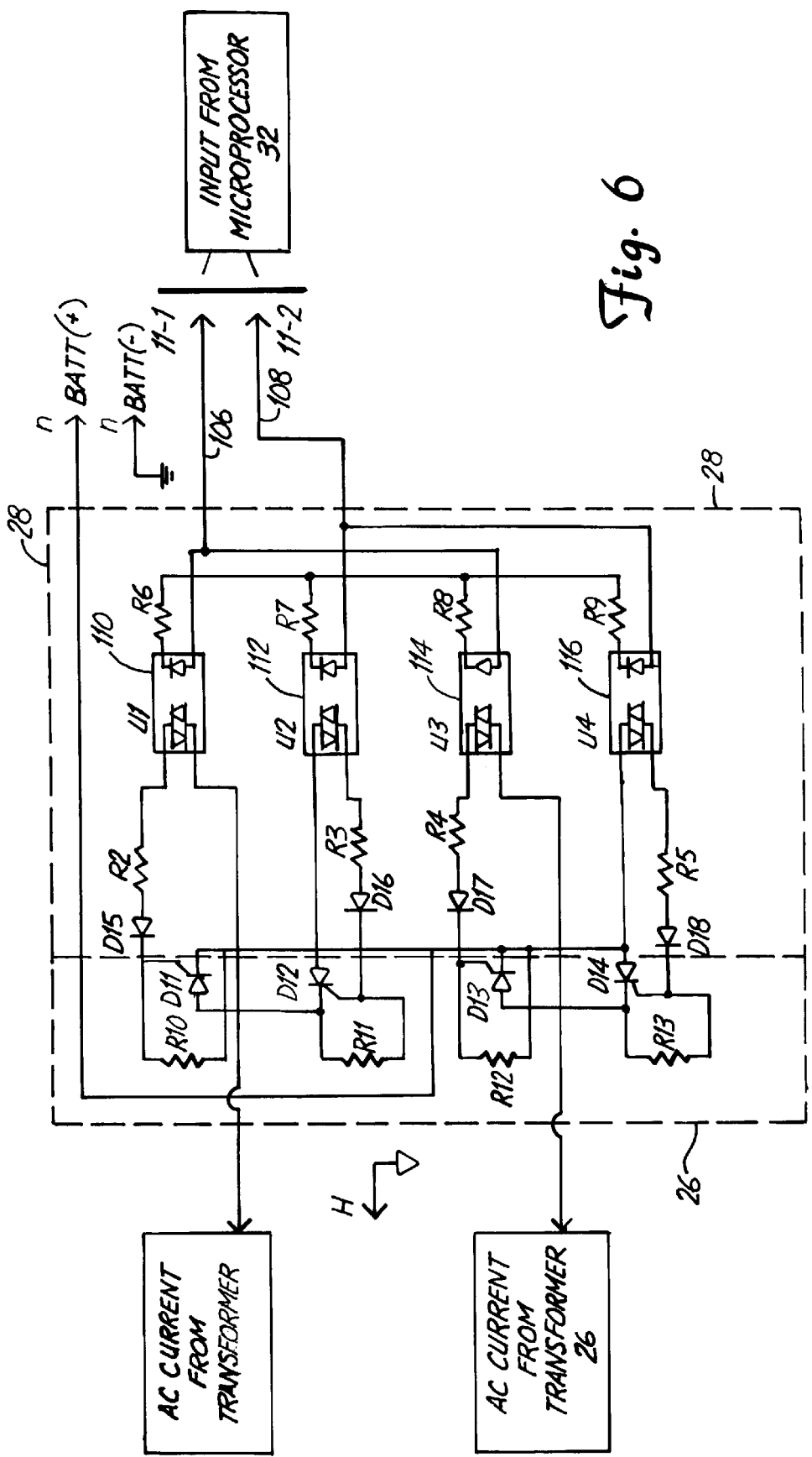
FIG. 6 shows the SCRs and SCR interface circuit.

With reference to FIG. 6, the SCR group 26 and the SCR interface circuit 28 will be described. As shown in FIG. 6, there are four SCRs in SCR group 26, represented by D11, D12, D13, D14. SCR D11 and SCR D13 are connected via the interface 28 to line 106 which goes to the processor 32, and SCR D12 and SCR D14 are connected in a similar manner to line 108 which also goes to the processor 32.

The SCR interface circuit 28 comprises four opto-isolated triacs 110, 112, 114, 116, which provide an interface between the processor 32 and the SCRs 26. Each SCR D11–D14 is connected to the opto-isolated triacs 110, 112, 114, 116 in the same manner. Each SCR D11–D14 is connected to two resistors and a diode. For instance, SCR D11 is connected to resistors R2, R10 and diode D15. SCR D12 is connected to resistors R11, R3 and diode D16. SCR D13 is connected to resistors R12, R4 and diode D17. SCR D14 is connected to resistors R13, R5 and diode D18. As shown in FIG. 6, the resistors R2, R3, R4, R5, respectively, are connected to the triacs 110, 112, 114, 116, respectively. The AC current from transformer 24 is also connected to diodes D11, D12, D13, D14 and triacs 110, 114.

In operation, the AC current from the transformer 24 is input to the SCRs D11–D14. The processor 32, based on its assessment of polarity via the polarity sensing detector 36 will control via lines 106 and 108 which triacs 110, 112, 114, 116 to enable, thereby, determining the path through which the current will flow to the battery 16. The battery 16 is attached via the attachment cables 12, 14 to the SCRs 26. The opto-isolated triacs 110, 112, 114, 116 receive pulses from the processor 32 through their respective current limiting resistors R6–R9. The pulses turn on the light emitting diode side of the triacs, which triggers the opto-coupled gate of the triac. The triac supplies current to the respective gate of the SCR to turn it on.

Depending on the polarity of the battery attachment cables 12, 14 the processor 32 will trigger two of the four SCRs D11–D14. SCR pair D11 and D13 is triggered when the battery is connected in a positive direction. They are used to form a full wave bridge to rectify and control the current being supplied to the battery 16. When the battery is connected in the negative direction, SCR pair D12 and D14 is connected to the battery charger transformer 24 to form a full wave bridge to rectify and control the current being supplied to the battery 16. Resistors R10–R13 are used to keep voltage spikes from inadvertently triggering the SCRs 26. Resistors R2–R5 limit the current used to drive the SCR gates. Diodes D1–D4 insure that the SCRs D11–D14 are only triggered in one direction.

Zero Crossing Detector

Figure 7:
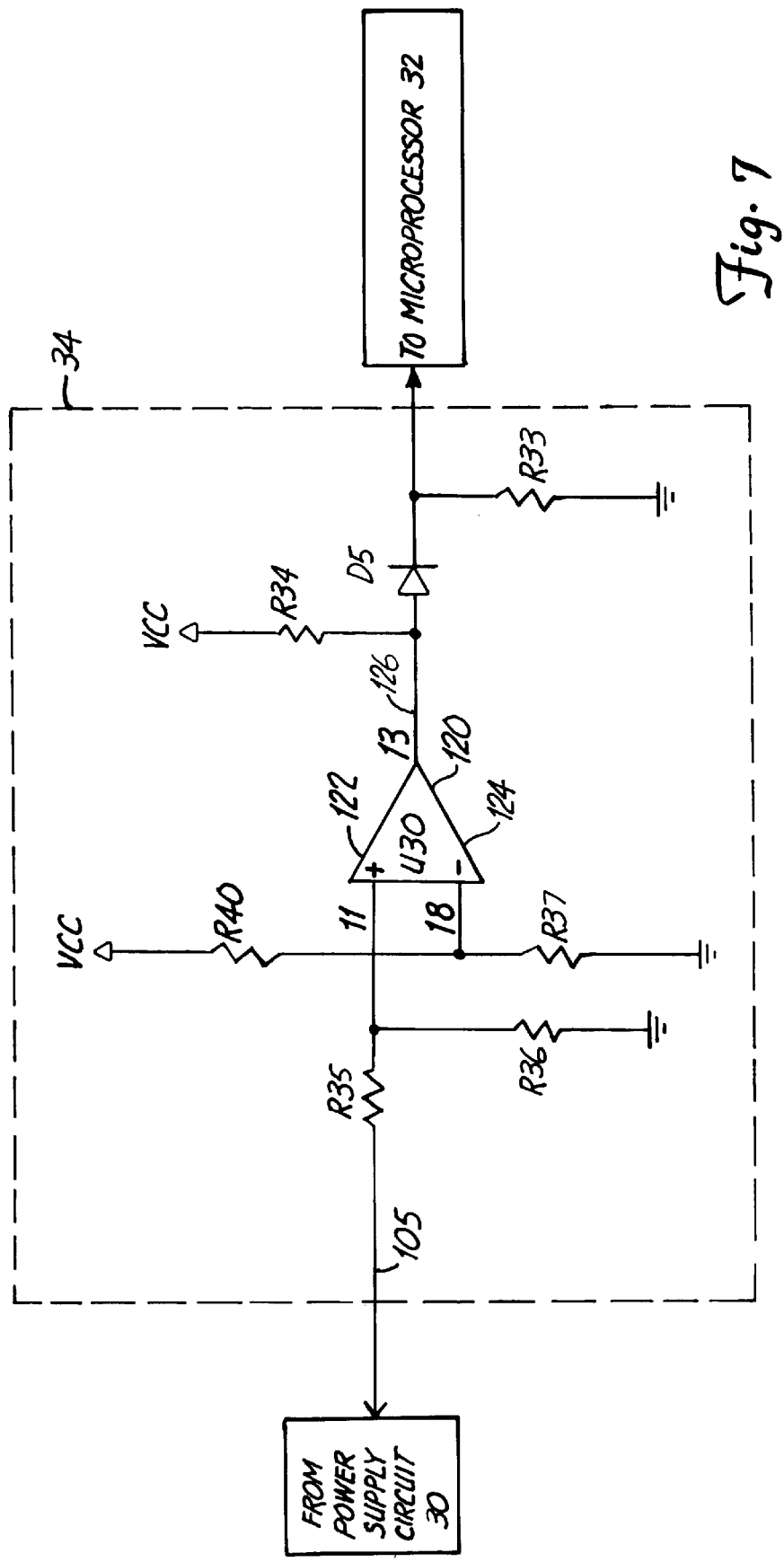
FIG. 7 shows the zero crossing detector.

Next, with reference to FIG. 7, the zero crossing detector 34 will be described. The zero crossing detector 34 allows the processor 32 to determine the voltage and current supplied to the battery 16 via the SCRs 26. As previously discussed and as shown in FIG. 5, the internal power supply circuit 30 outputs a full wave rectified DC to the zero crossing detector 34. The zero crossing detector 34 has a comparator 120. The comparator 120 has a positive input 122 and a negative input 124. The positive input is connected to the output from the power supply circuit 30 via resistor R35 and connected to ground via resistor R36. The negative input 124 is connected to a voltage divider circuit comprised of resistors R40 and R39 which is connected to the internal power supply circuit 30. The output 126 from the comparator 120 is input to diode D60, the output of which goes to the processor 32. The output line is also connected to resistors R34 and R33.

The positive comparator input 122 is connected to the internal power supply circuit 30. A pulsating full wave rectified DC is input to the positive input 122 of the comparator 120. The negative input 124 of the comparator 120 is biased at a voltage just above zero. When the positive input 122 of the comparator 120 is lower than the negative input 124 of the comparator 120, then the output of the comparator 120 to the processor 32 is a logical low, signaling that the DC wave is near the zero crossing. This low output from the zero crossing circuit 34 triggers an interrupt in the processor 32 to start the secondary phase control count. Based on the user's selections with regard to voltage of the battery 16 to be charged and the rate of current to be output to the battery 16, the processor 32 determines the number of counts before enabling the SCRs 26. The number of counts the processor 32 waits before triggering the SCRs 26 via lines 106 and 108 as shown in FIG. 6 determines the voltage and current supplied to the battery 16. Each portion 422, 424 of the rectified wave 426 (see FIG. 5B) represents an amount of current that could be supplied to the battery. Depending on the user's selection with regard to voltage of the battery and the rate of current, the zero crossing detector 34 counts to a particular number before enabling the SCRs 26. The time period which elapses during the counting allows the processor to control the amount of current supplied to the battery 16. Thus, when the user selects the engine start option, 70 amps of current must be supplied to the battery 16. In this case, the microprocessor 32 will provide more of the available DC waveform than when the user selects the battery to be charged with 2A or 15A of current.

Voltage Determining Circuit

Figure 8:
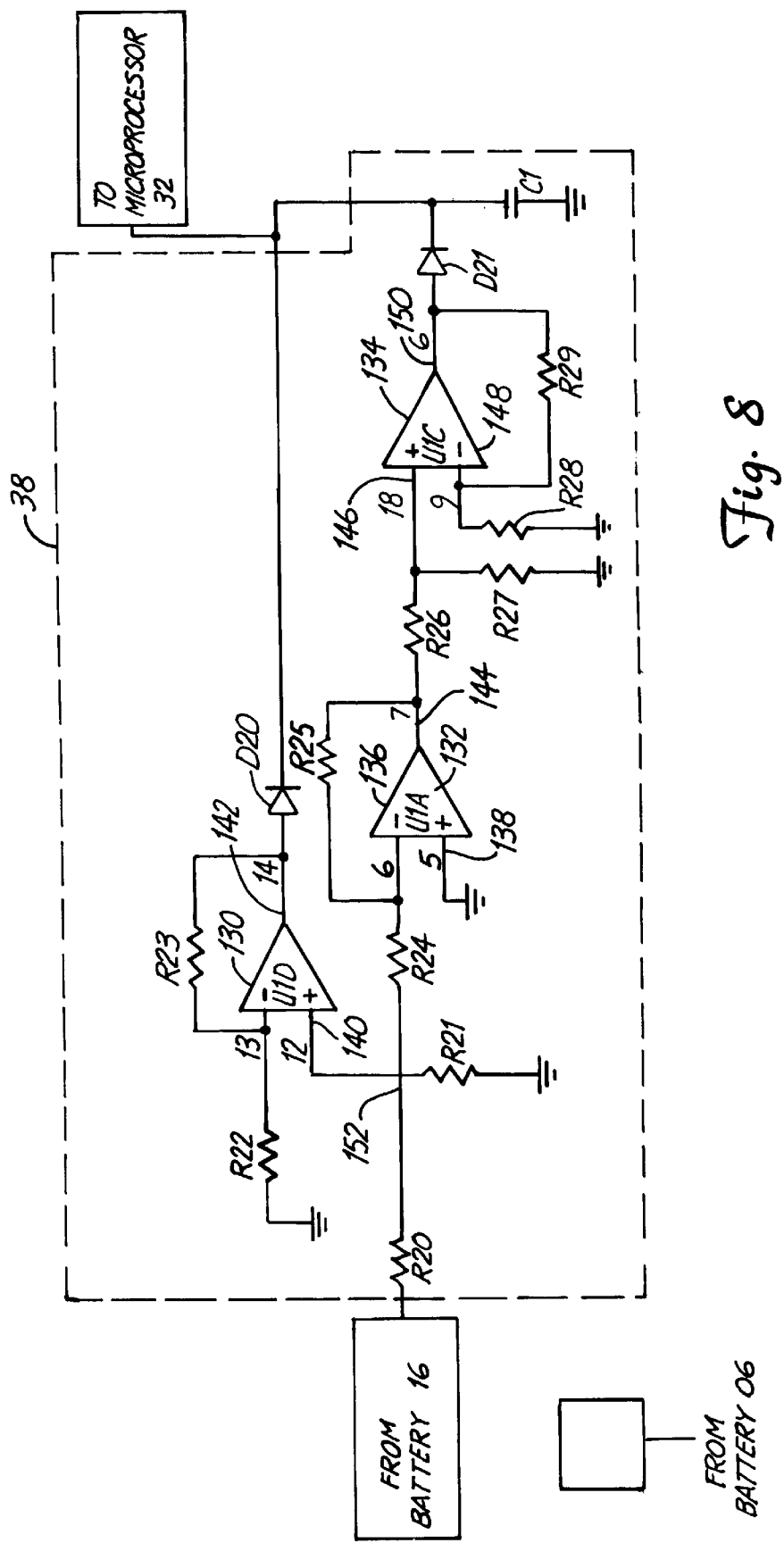
FIG. 8 shows the voltage determining circuit.

With reference to FIG. 8, the voltage determining circuit 38 will be described. The voltage determining circuit 38 comprises three comparators 130, 132, 134, resistors R20–R29, and diodes D20–D21. Resistor R20 is connected to the battery and to resistor R21, which is connected to ground. The node 152 connecting R20 and R21 is connected to resistor R24 which is input into the negative input 136 of comparator 132, the positive input of comparator 132 is connected to ground. The node 152 connecting resistors R20 and R21 is also connected to the positive input 140 of comparator 130. The negative input of comparator 130 is connected to ground through resistor R22. The negative input of comparator 130 is also connected via resistor R23 to the output 142 of comparator 130. The output 142 of comparator 130 is also connected to the input of diode D20, the output of which is sent to the processor 32.

The negative input 136 of comparator 132 is connected via resistor R25 to its output 144. The output 144 of comparator 132 is connected through resistor R26 and R27 to ground. Also, the output 144 is connected through resistor R26 to the positive input 146 of comparator 134. The negative input 148 of comparator 134 is connected to ground via resistor R28. The negative input of comparator 134 is also connected to the output 150 of comparator 134 through resistor R29. The output of comparator of 134 is connected to diode D21, the output of which is input to the processor 132.

In operation, the voltage from the battery 16 is supplied to the voltage determining circuit 38 through resistor R20. Resistors R20 and R21 form a voltage dividing circuit that reduces the voltage at node 152 relative to the full voltage from the battery 16. Since the attachment cables 12, 14 can be connected in either direction, the divided voltage could be either positive or negative. If the voltage at node 152 is positive, then it is input into the positive input 140 of comparator 130. This comparator 130 is configured as a non-inverting amplifier which scales the divided voltage to be ⅙ of the battery voltage. Thus, the output to the processor 32 through diode D20 is ⅙ of the battery voltage. The voltage output to the processor 32 is between plus or minus 5 volts DC. This range is used because the processor 32 can only measure positive voltage between zero and 5 volts.

If the voltage at node 152 is negative, i.e. the attachment cables 12, 14 have been reversed, this voltage via resistor R24 is input to the negative input 136 of comparator 132. This comparator 132 inverts the voltage thereby making it a positive voltage at resistor R4, which with resistor R27 divides the voltage of the non-inverting amplifier 134 to scale the divided voltage to be ⅙ the battery voltage. The diodes D20 and D21 are used to isolate the two outputs inverted and non-inverted for negative or positive voltages so that processor 32 sees only a positive ⅙ battery voltage regardless of the polarity. The processor 32 via software uses this value to perform various calculations to determine (1) whether the battery can accept charge, or (2) whether the battery is fully charged.

Polarity Sensing Circuit

Figure 9:
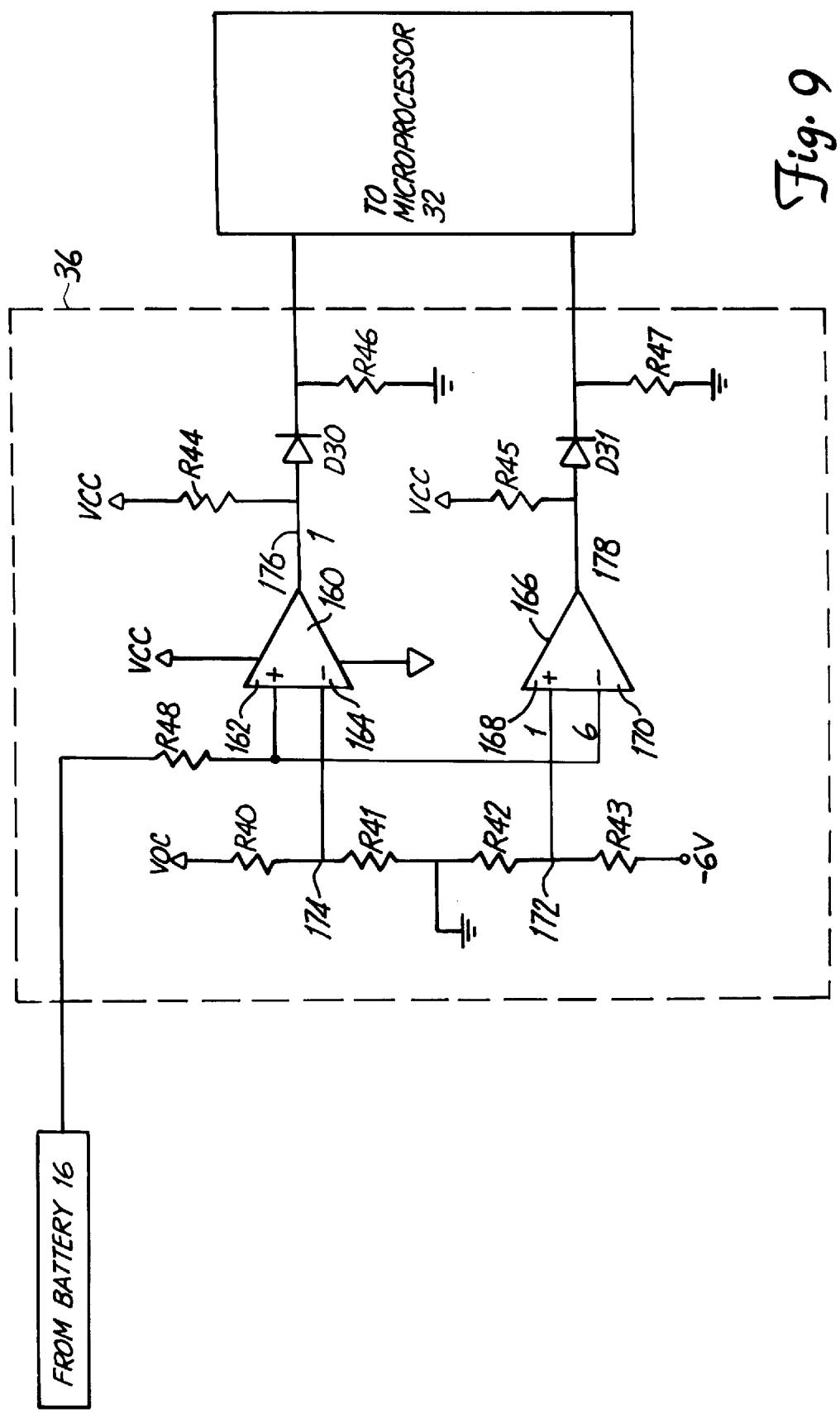
FIG. 9 shows the polarity sensing circuit.

With reference to FIG. 9, the polarity sensing circuit 36 will be described. The polarity sensing circuit 36 comprises comparator 160, 166. Each comparator having a positive input 162, 168 and a negative input 164, 170, respectively. The positive input 162 of comparator 160 and the negative input 170 of comparator 166 is connected to the battery 16 through resistor R48. The negative input of comparator 160 is connected to resistors R40, R41 at node 174. Resistor R40 is connected to the internal power supply circuit 30 which provides a positive voltage. The positive comparator input 168 of comparator 166 is connected to resistors R42 and R43 at node 172. Resistor R43 is connected to the negative power supply circuit 37 which provide a negative voltage. In the preferred embodiment, resistors R40 and R41 have values such that a positive one volt is supplied to the negative input 164 of comparator 160 and resistors R42 and R43 have values such that a negative one volt is supplied to the positive input 168 of comparator 166. It should be noted that the values of resistors R40, R41 can be manipulated so that the voltage at the negative terminal 164 can range from a voltage slightly greater than zero volts to a voltage slightly less than the five or six volts provided by the internal power supply circuit 30. Similarly, the values of resistors R42, R43 can be manipulated so that the voltage at the positive terminal 168 can range from a voltage slightly less than zero volts to a voltage slightly greater than the negative six volts supplied by the negative power supply circuit 37. The output of comparator 160, 176 is connected to diode D30. The output of comparator 166 is connected to diode D31. Outputs of diode D30 and D31 are connected to the microprocessor 32.

In operation, the battery voltage is supplied to the positive input 162 of comparator 160 and negative input 170 of comparator 166. If the battery voltage is a positive one volt or greater, voltage at the positive input 162 of comparator 160 is greater than the voltage at the negative input 164 of comparator 160. (As stated above, the voltage at the negative input 164 with comparator 160 is a positive one volt due to resistors R40 and R41.) When the voltage at the positive input 162 of comparator 160 is greater than the voltage at the negative input with comparator 160, the output 176 is a logical one or a high which is sent through diode D4 to the microprocessor. The software operable on the processor 32 (which will be later described) recognizes the logical one or high as indicating battery connection in a positive direction.

If the battery is connected in the negative direction (minus one volt or less), then the voltage at the negative input of comparator 166 is less than the voltage at the positive input of comparator 166 (which is a negative one volt due to resistors R42 and R43). When the voltage at the negative input 170 is less than the voltage at positive input 168 of comparator 166, this causes the voltage at the output 178 of comparator 166 to send a high or logical one through diode D31 to the microprocessor 32. The processor 32 recognizes the logical one or high as a battery connect in the negative direction.

Thus, depending on which comparator 160 or 166 provides the high or logical one output to the microprocessor, the processor 32 determines whether the battery polarity is connected in the positive direction or the negative direction. This determination affects the microprocessor's method of controlling which SCRs 26 will supply current to the battery 16 when charging the battery 16.

Moreover, because the threshold voltages at the negative terminal 164 and the positive terminal 168 are set at plus and minus one volt, the polarity sensing detector can only sense polarities if the battery 16 has at least one volt. However, if these threshold voltages are closer to zero, then the battery voltage in the battery to be charged necessary for this polarity sensing detector 36 to operate would be a voltage above zero.

Negative Voltage Power Supply

Figure 10:
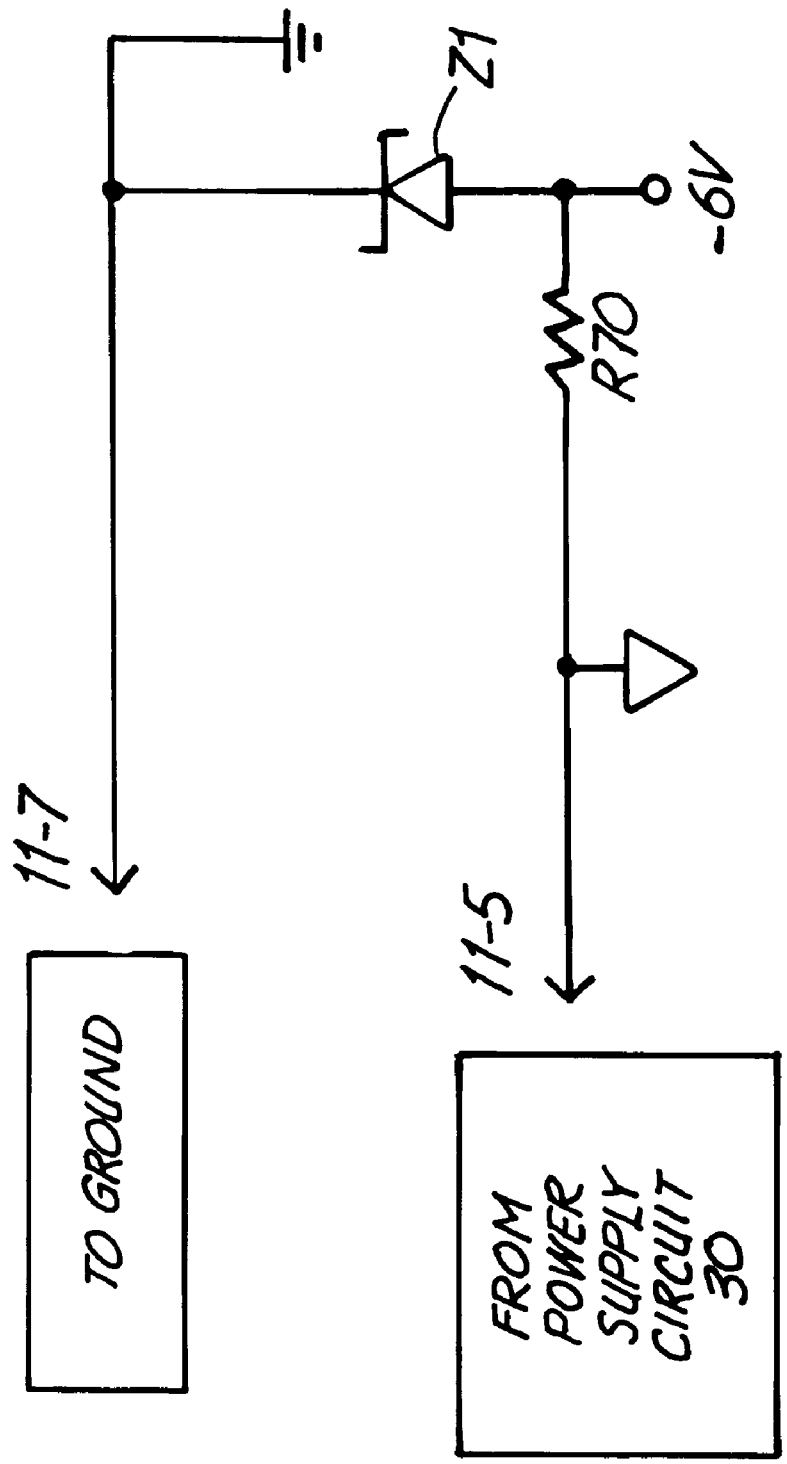
FIG. 10 shows the negative voltage supply circuit.

With reference to FIG. 10, the negative voltage power supply 37, which is used in the polarity sensing circuit 36 to provide the negative voltage for comparator 166 (see FIG. 9), will be described. The circuit 37 comprises a zener diode 21 and resistor R70. The zener diode 71 is connected to ground and to line 104 of internal power supply circuit 30 (FIG. 5) through resistor R70. The reverse voltage drop across the zener diode 71 measured at the junction of resistor R70 and zener diode 71 is used as the regulated negative voltage supply. This regulated negative voltage supply allows the polarity sensing detector 36 (FIG. 9) to have a negative voltage supply to comparator 166 (see FIG. 9).

Control Panel and Processor

Figure 11:
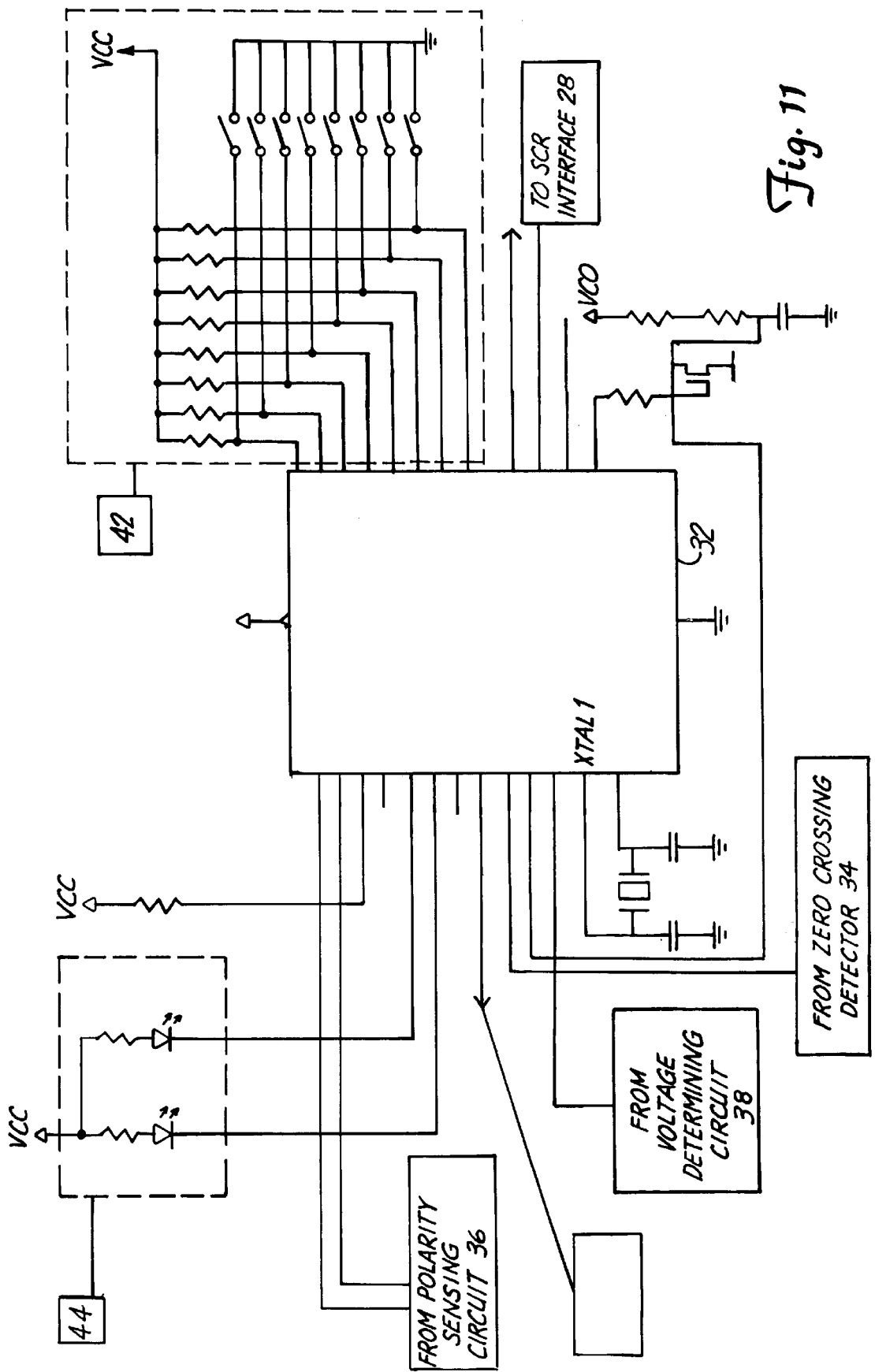
FIG. 11 shows the processor, the LEDs, and the control panel.

With reference to FIG. 11, the control panel 42, the LEDs 44, and the processor 32 will be described. The control panel 42 includes switches S?–S? on the front of the battery charger 10. These switches allow the user to choose the battery voltage of the battery 16 to be charged (6 or 12 volt), select the rate of flow of the charge current (2 or 15 amps), or select engine start (6 or 12 volt systems) as opposed to charging a battery. The selections made by the user are input into the processor 32. The software in the processor 32 which will be described later, uses the selections in making determination of (1) how fast to charge the battery; (2) whether the battery 16 is accepting charge; and (3) whether the battery 16 is fully charged.

The LED visual indicator 44 has LED lights connected to the processor 32 by which the processor can indicate to the user whether (1) whether the attachment cables 12, 14 are connected to the battery 16; (2) whether the battery 16 can accept a charge; and (3) whether the charging of the battery is complete.

In one embodiment, the charger 10 will have two LEDs 44, a yellow LED and a green LED. At startup, when the user connects the attachment cables 12, 14 to the battery 16, both LEDs 44 will light up for a few seconds to indicate that the attachment cables 44 are connected to the battery 16. If both LEDs 44 do not light up, then it could mean that because of corrosion or any other reason, there is no electrical connection between the attachment cables 12, 14 and the battery. If during the time the battery 16 is being charged, the charger 10 determines that the battery cannot accept charge, then the yellow light will be illuminated. Finally, once the battery 16 is fully charged, the green LED is illuminated.

As shown in FIG. 11, the processor 32 has a number of pins. Eight pins receive the selections made by the user through switches S?–S? of the control panel 42 and there are inputs for receiving the outputs of the polarity sensing circuit 36, the voltage determining circuit 38, and the zero crossing detector 34. Also, output from the processor 32 to the SCR 28 interface and the LEDs 26 are indicated. The processor 32 used in the present invention is a standard microprocessor, such as Model No. Z86C33 manufactured by Zilog Corp., which uses ports P20–P27 to detect the switch inputs S1–S8 at the control panel 42. The switches have a normally open position, and the ports are pulled up to a logical one by the connector resistor. The software operable on the microprocessor 32 polls the ports P20–P27 waiting to detect a switch closure signaling the start of a charge or an engine start sequence.

Software

Figure 12:
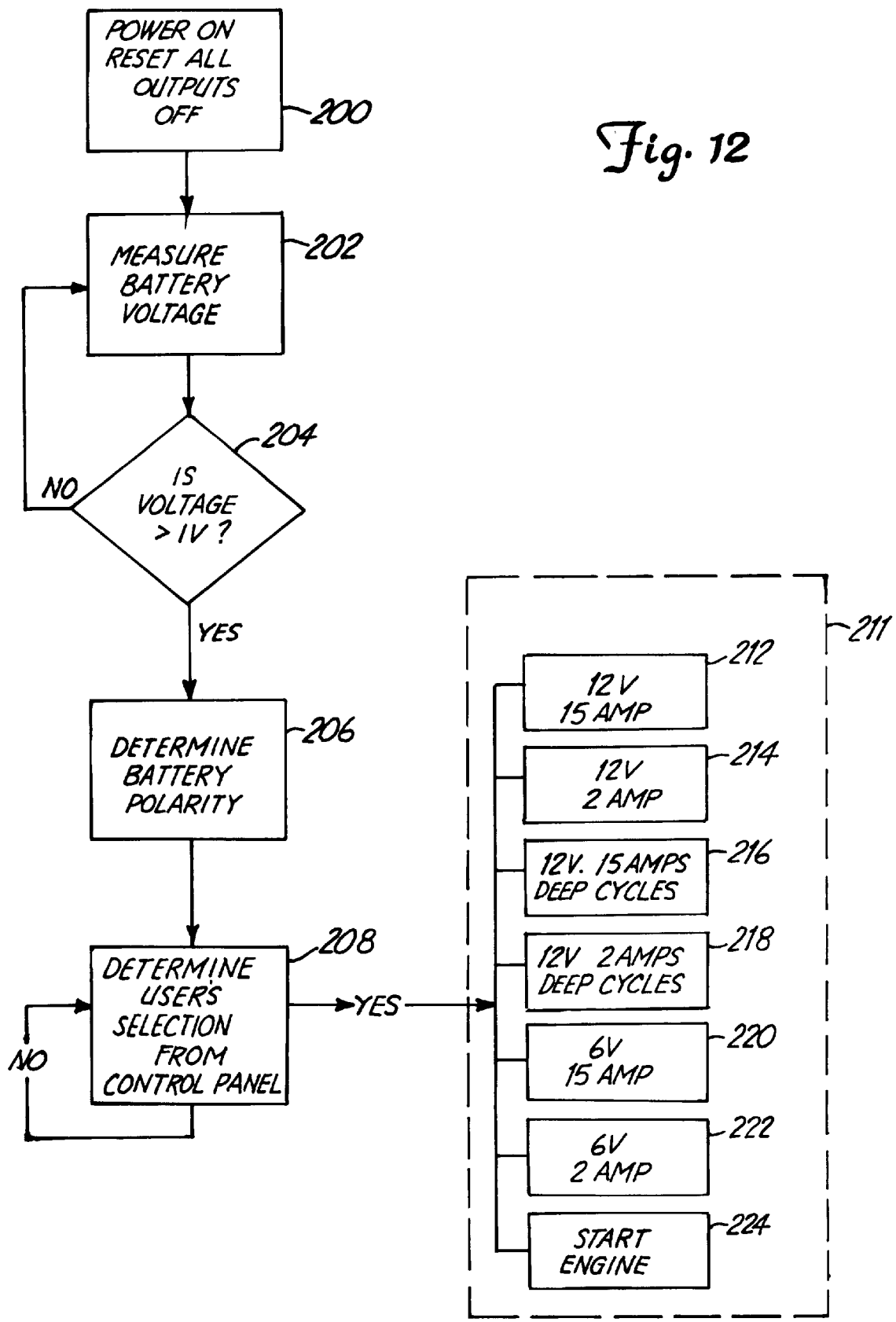
FIGS. 12–14 are flowcharts for the software operable on the processor.
Figure 13A:
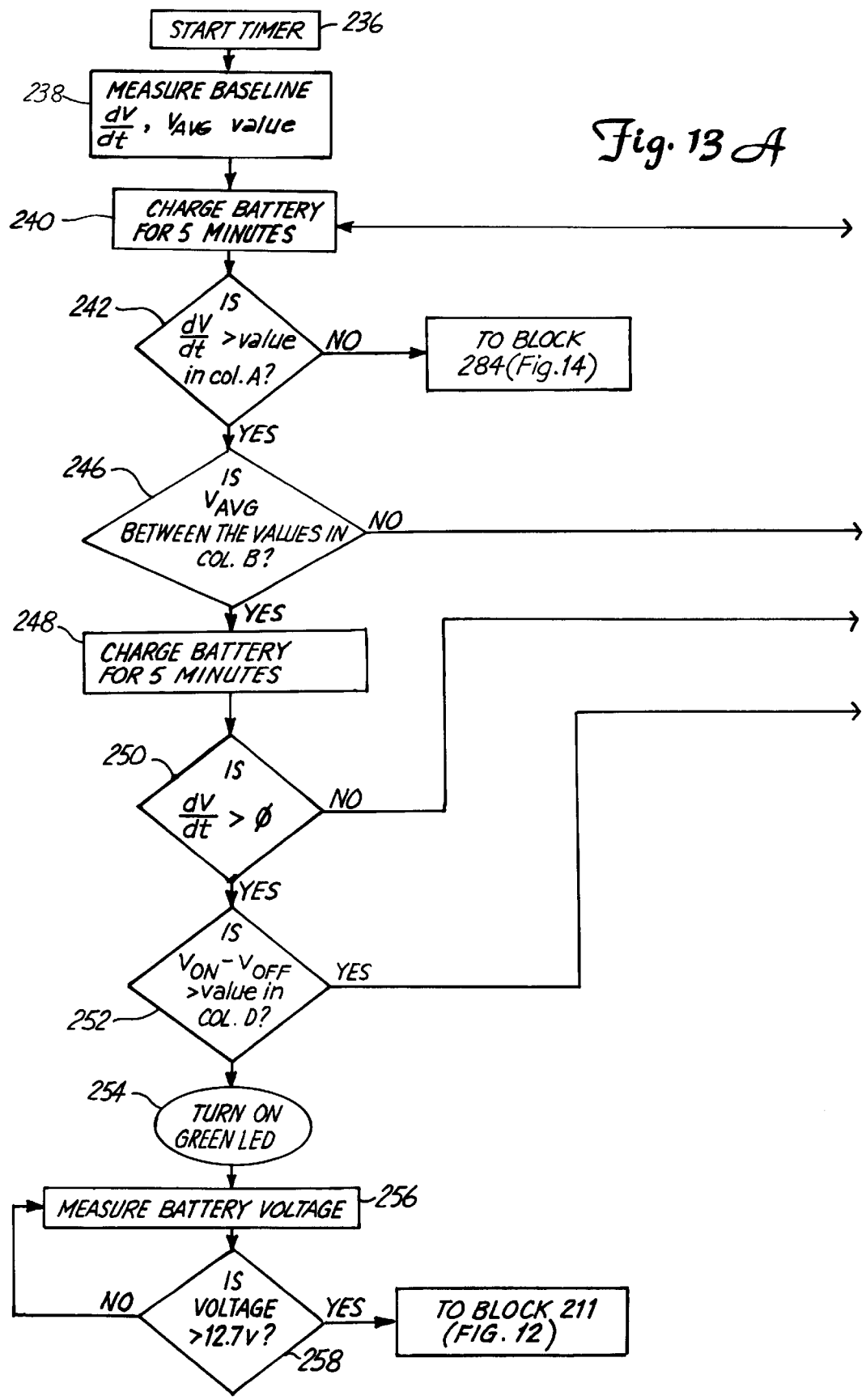
Figure 13B:
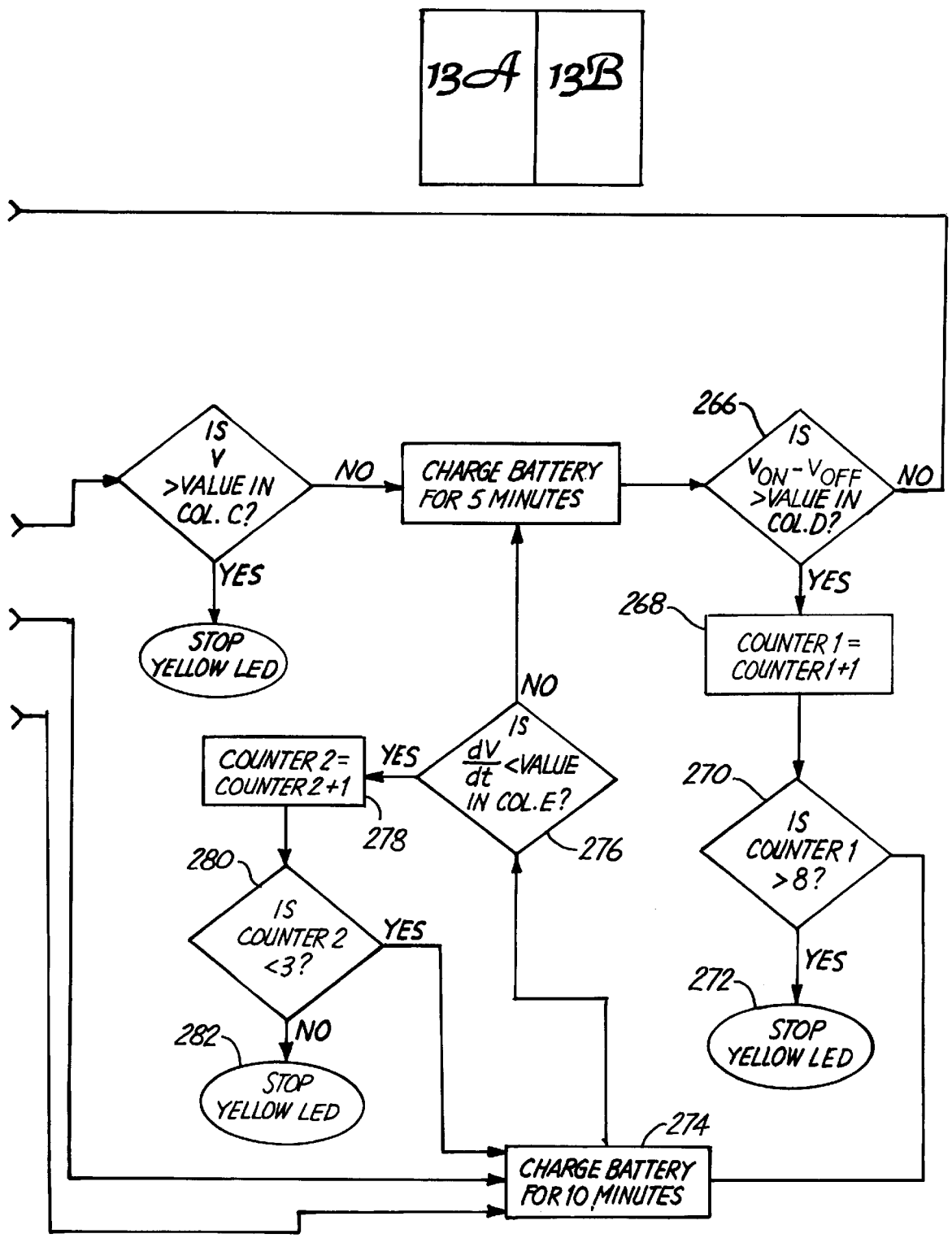
Figure 14A:
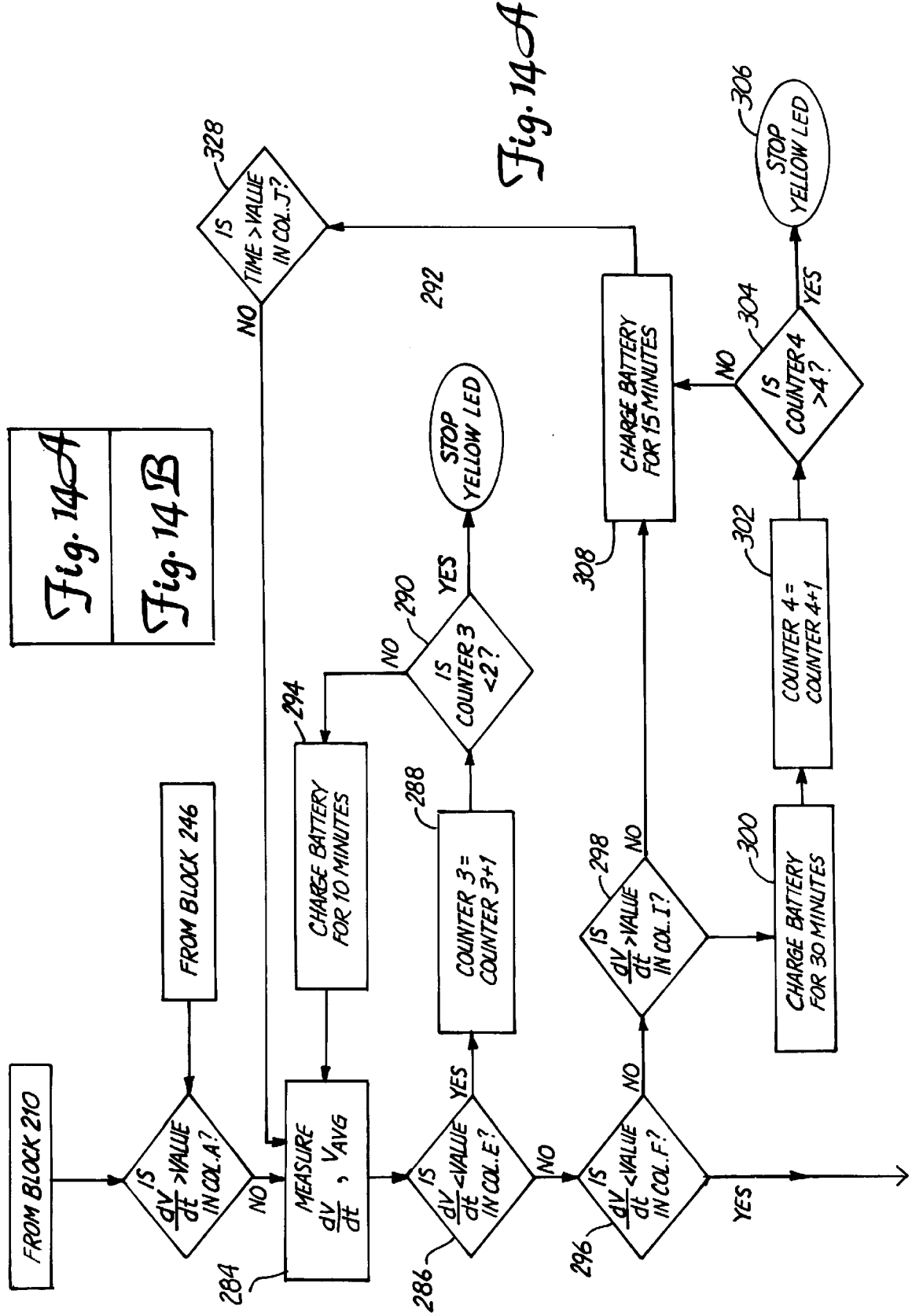
Figure 14B:
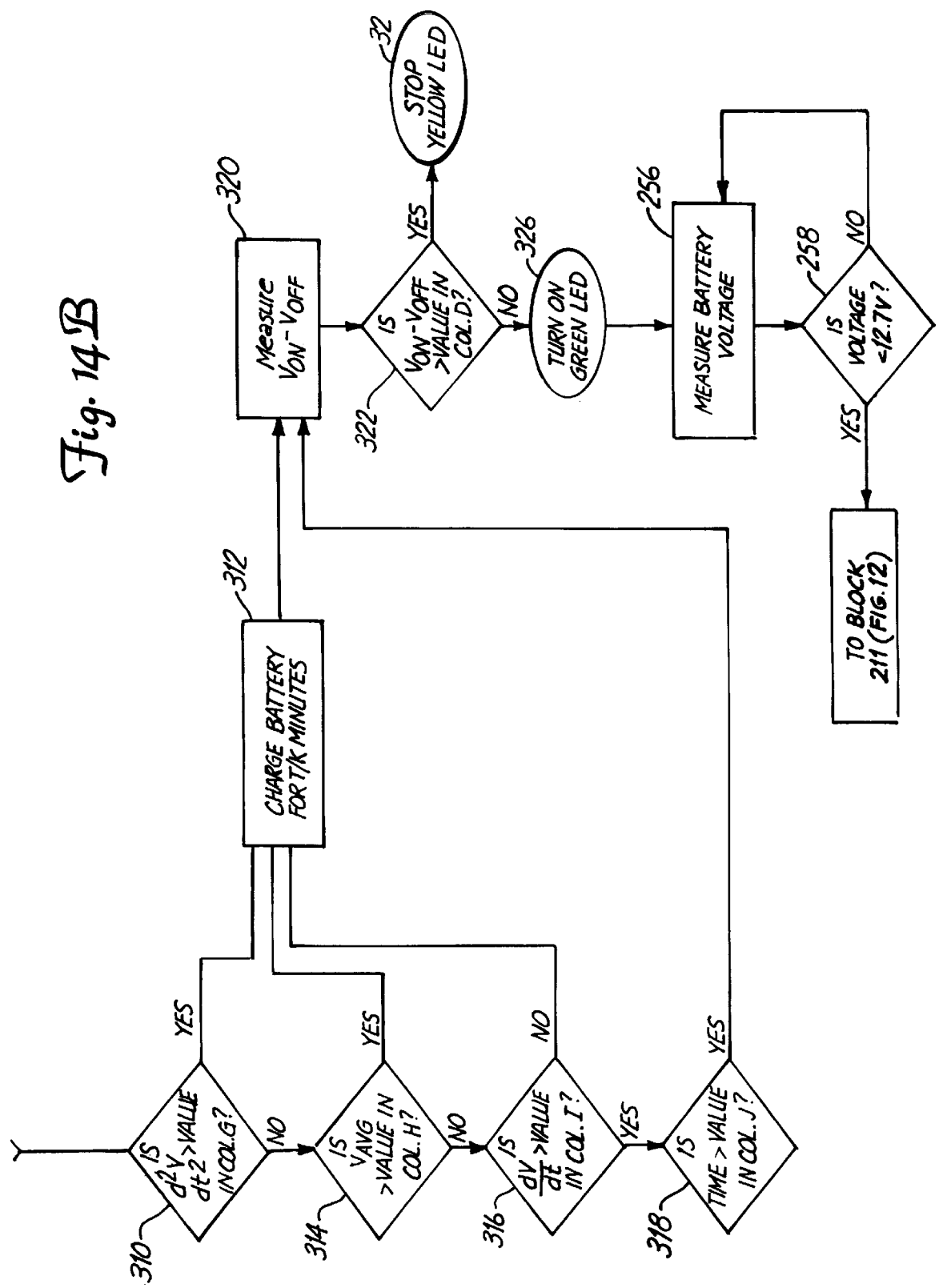

With reference to FIGS. 12–14, the software contained on the microprocessor 32 will be described. The software determines polarity and monitors the charging of the battery. The software will be described in three separate sections: (1) the steps performed by the software at startup; (2) steps performed by the software to determine if the battery 16 is fully charged; and (3) steps performed by the software to determine if the battery can accept charge.

Before explaining the details of the software, a brief overview of the software will be provided. The software effectively categorizes batteries connected to the charger in ocharger in one of five categories: (1) the battery 16 is normal; (2) the battery 16 is fully charged at the time the battery is connected to the charger 10; (3) the battery 16 is sulfated; (4) the battery 16 is negatively-charged; or (5) the battery 16 is frozen. Categories (2)–(5) indicate that the battery is abnormal The software monitors the battery 16 during the charging of the battery or during the period that current is supplied to the battery 16 for the engine start to determine whether the battery is normal or abnormal. If the battery is normal, then the charger monitors the battery to determine when it is fully charged. However, if the charger determines that the battery is abnormal, then the charger shuts off the current supply to the battery and communicates to the user that the battery is abnormal.

a. Software at Startup

FIG. 12 shows the steps performed by the software operable on the processor 32 at startup, i.e., when the attachment cables 12, 14 of the battery charger 10 are first connected to a battery 16 and the battery charger 10 is plugged into an AC outlet. When the battery charger 10 is plugged into an AC outlet, the first step 200 performed by the software is to initialize the processor 32 and to turn off all of the output ports. With reference to FIG. 11, the output ports include the two lines 106, 108 to the SCR interface circuit 28, the lines to the LEDs 44, and the output to the current meter 40. Before turning off the output ports, the processor 32 will cause both LEDs 44 to light up indicating that there is a good electrical connection between the attachment cables 12, 14 and the battery 16.

Next, as shown in FIG. 12, the software polls the outputs from the polarity sensing circuit 36 to measure the battery voltage and see if a battery voltage greater than +1 volt or less than −1 volt is present 202. The polarity sensing circuit 36 can provide this information, because the threshold voltages at the comparators are +1 and −1 volt. Based on the results of the polling, the software determines if the absolute value of the voltage measured is greater than 1 volt 204. If the absolute value of the polled voltage is not greater than one volt, then the voltage is measured again in step 202. The software will not proceed any further if the absolute value of the polled voltage is not greater than 1 because of safety. If the battery 16 has less than one volt, then there are safety concerns with the polarity detection. However, an unloaded battery usually has more than 1 volt of charge. If the battery is loaded and the battery 16 has less than 1 volt then the user should disconnect all external loads from the battery. After disconnection of any external loads, the battery voltage should rise above 1 volt.

If the absolute value of the polled voltage is greater than one, then the next step performed by the software is to determine the battery polarity 206. The determination of the battery polarity 206 allows the processor 32 to determine which configuration of SCRs 26 should be activated to charge the battery i6. As described with reference to FIG. 9, based on the port through which the processor 32 detects a high or a logical one, the processor determines if the attachment cables 12, 14 are connected such that the nominal polarity indicated on the attachment cable 12, 14 matches the polarity of the battery terminal to which it is attached (this configuration will be referred to as the "proper" configuration).

If the cables 12, 14 are connected properly, then SCRs D11 and D13 are triggered via the SCR interface circuit 28. When the battery is connected in the reverse direction, SCRs D12 and D14 are connected to the battery charger transformer to form a full wave bridge to rectify and control the current being supplied to the battery. Thus, lines 106, 108 which connect the processor 32 to the SCR interface circuit 28 are used by the processor 32 to enable SCRs D11 and D13 or SCRs D12 and D14, depending on the output from the polarity sensing circuit 36, which allows the microprocessor 32 to determine the polarity configuration of the attachment cables 12, 14 to the battery 16.

The final step performed during the startup phase is for the software to determine the user's selections by polling the control panel 42. In order to determine the user's selections, the software loops 209 until a user selected switch closure is detected 210. Blocks 212–224 represent the various possible switch selections which allow the user to (1) choose the battery voltage (6 or 12 volt), (2) select the rate of flow of the charge current (2 or 15 amps), and select either engine start (6 or 12 volt systems) or to charge a battery. At this point, the battery charger 10 begins supplying current to the battery 16, thereby charging the battery 16. The remainder of the software contains routines to monitor the charging of the battery 16 or monitor the battery during engine start. In performing this monitoring function, the software will shut off current to the battery 16 if (1) the battery 16 is already fully charged; (2) the battery 16 is sulfated; (3) the battery 16 has been negatively charged; or (4) the battery 16 is frozen. Also, the software monitors the total amount of time the charger 10 has been supplying current to the battery 16 and shuts off the current supply to the battery 16 when a maximum time period for charging a battery is reached.

b. Look-Up Table

As stated above, the software effectively categorizes batteries 16 connected to the charger 10 in one of five categories: (1) the battery 16 is normal; (2) the battery 16 is fully charged at the time the battery is connected to the charger 10; (3) the battery 16 is sulfated; (4) the battery 16 is negatively-charged; or (5) the battery 16 is frozen. Categories (2)–(5) indicate that the battery is abnormal The software enables the charger to monitor the battery 16 during the charging of the battery 16 or during the period that current is supplied to the battery 16 for the engine start to determine whether the battery 16 is normal or abnormal. If the battery is normal, then the charger 10 monitors the battery 16 to determine when it is fully charged. However, if the charger 10 determines that the battery 16 is abnormal, then the charger shuts off the current supply to the battery and communicates to the user that the battery is abnormal.

In order to perform these functions, the charger 10 utilizes a table called the Look-Up Table of the Charger Controller ("Look-Up Table") shown in FIG. 15. The Look-Up Table contains an entry for each of the selections which can be made by the user: (1) charge a 12V battery at 15A or 2A; (2) charge a 12V deep cycle battery at 15A or 2A; (3) charge a 6V battery at 15A or 2A; and (4) perform an engine start rather than charge a battery. The various columns A to K represent values for various battery charging parameters, derived from charging representative samples of all known automotive, deep cycle, or marine batteries. Each of the columns represent characteristic parameter values to allow the software to determine whether the battery is (a) fully charged; (b) sulfated; (c) negatively charged; or (d) frozen. Also, the values allow the software to determine if the battery is fully charged and how much time it should continue to supply current to a fully charged battery to complete the charge.

c. Charging a Normal Battery

With reference to FIGS. 12–14, the steps performed by the software when a normal depleted battery 16 is connected to the charger 10 will be described. As stated above with respect to FIG. 12, when a user connects the attachment cables 12, 14 of the charger 10 to a depleted battery 16 and the battery charger is plugged into an AC current outlet, the startup procedure is performed. Once the battery polarity has been determined 206 and the user's selection from the various options 212–224 via the control panel 42 has been determined 210, the battery charger 10 begins supplying current to the battery 16.

As shown in FIG. 13, when the battery charger 10 begins supplying current to the battery 16, a timer is started 236. This timer keeps track of the total charge time. This information is used to make sure that the battery is not charged for more than a certain maximum number of hours. Also, this timer is used by the processor 32 to determine when a period of time has elapsed.

Next, the processor 32 performs an initial measurement 238 of the average voltage ("Vavg") and the rate of change in the battery voltage with respect to time ("dv/dt"). The initial instantaneous voltage measurement is Vavg. However, the processor periodically measures the battery voltage and calculates new Vavg.

Now, with reference to FIG. 14, the sequence of steps performed by the software contained in the microprocessor 32 for normal charging of a battery 16 will be described. When the charger 10 is charging a battery 16, it must determine when the battery 10 is fully charged. Consequently, the steps performed by the software during a normal charging of the battery test the battery to determine if the battery is fully charged. After the initial measurements have been made 238, the charger 10 monitors the charging of the battery 16 for a five (5) minute period 240. This time period allows for the stabilization of the various calculations made by the processor 32.

Next, the rate of change of voltage with respect to time "dv/dt" (which is based on the comparison of voltage readings taken over a five minute period 240) is determined 242. This measured rate is compared to the rate given in Column A of the Look-Up Table to decide if the battery voltage is increasing too quickly. If the rate of change of voltage with respect to time is greater than the value in Column A for the switch selected in block 211, which comprises the various selections 212–224, then there is an indication that the battery 16 may be in an abnormal condition (i.e., the battery 16 is (1) fully charged at the time it is connected to the charger, (2) sulfated, or (3) negatively charged) (all of these conditions will be discussed later). However, during a normal charge of a discharged battery, the change in voltage with respect to time as measured in block 242 will be less than the value in Column A. At this point, the program has determined in block 242 that the battery is acting like a normal depleted battery that needs to be charged.

As shown in FIG. 14, once the program has determined that dv/dt is less than the rate specified in Column A, the program continues to determine the rate of change in voltage with respect to time and Vavg 284. The program then determines if the rate of change in voltage with respect to time is less than the value in Column E of the Look-Up table 286. This test is to determine if the battery 16 is negatively charged (this test will be described later in conjunction with the discussion regarding the detection of a negatively charged battery). During the normal charging of a depleted battery 16, the rate of change in voltage with respect to time will be greater than the value in Column E of the Look-Up table.

Once the processor 32 has determined that the battery 16 is not negatively charged (i.e., the rate of change of voltage with respect to time is greater than the value in Column E), then the program determines if the battery 16 is fully charged by monitoring whether the battery voltage has exceeded a minimum voltage level for a fully charged battery. In order to determine if the battery voltage has exceeded the minimum voltage level for a fully charged battery specified in Column F, the processor 32 first calculates the average voltage 296 of the battery 16. Then the processor 32 compares Vavg to the value in Column F (i.e., the minimum voltage level for a fully charged battery).

If Vavg does not indicate that the minimum voltage level for a fully charged battery 16 has not been reached (i.e., Vavg is not greater than the value in Column F), then the program goes to block 298 where the battery 16 is checked to determine whether the battery 16 is frozen 298 (the steps performed to determine whether a battery is frozen will be described later). During the charging of a normal depleted battery 16, the test in block 298 will fail (i.e., dV/dt will be greater than the value in Column I of the Look-Up table).

If Vavg does not indicate that the minimum voltage level for a fully charged battery 16 has not been reached (i.e., Vavg is not greater than the value in Column F) and the battery is not frozen (i.e., dv/dt is greater than the value in Column I), then (1) the battery 16 is charged for 15 minutes 308; (2) the total amount of time the battery 16 has been charging is determined to ensure that the battery has not charged for a period exceeding the maximum amount of time to be charged (which are represented by the values in Column J of the Look-Up table) 328; (3) Vavg is measured 284; (4) the battery is checked to determine if it is negatively charged 286; and (5) the battery voltage is checked again to determine if it exceeds the minimum voltage level for a fully charged battery 296. During a normal charge of a battery 16, these steps (i.e., the steps in blocks 296, 298, 308, 328, 284, and 286) are continuously performed until (1) the amount of time the battery 16 has been charged exceeds the maximum charge time value given in Column J (the result of this condition will be described later); or (2) Vavg exceeds the minimum voltage level for a fully charged battery.

When the average voltage, measured at block 296, is greater than the minimum voltage level for a fully charged battery (i.e., Table F value), the software runs three separate tests to determine if the battery 16 has been charged to a level above the minimum voltage level so that it can complete charging the battery 16: (1) has the acceleration of the voltage with respect to time become a positive value from a negative value 310; (2) is the battery voltage greater than an upper limit for a fully charged battery 314; or (3) is the voltage increasing at a very slow rate 316.

Figure 16:
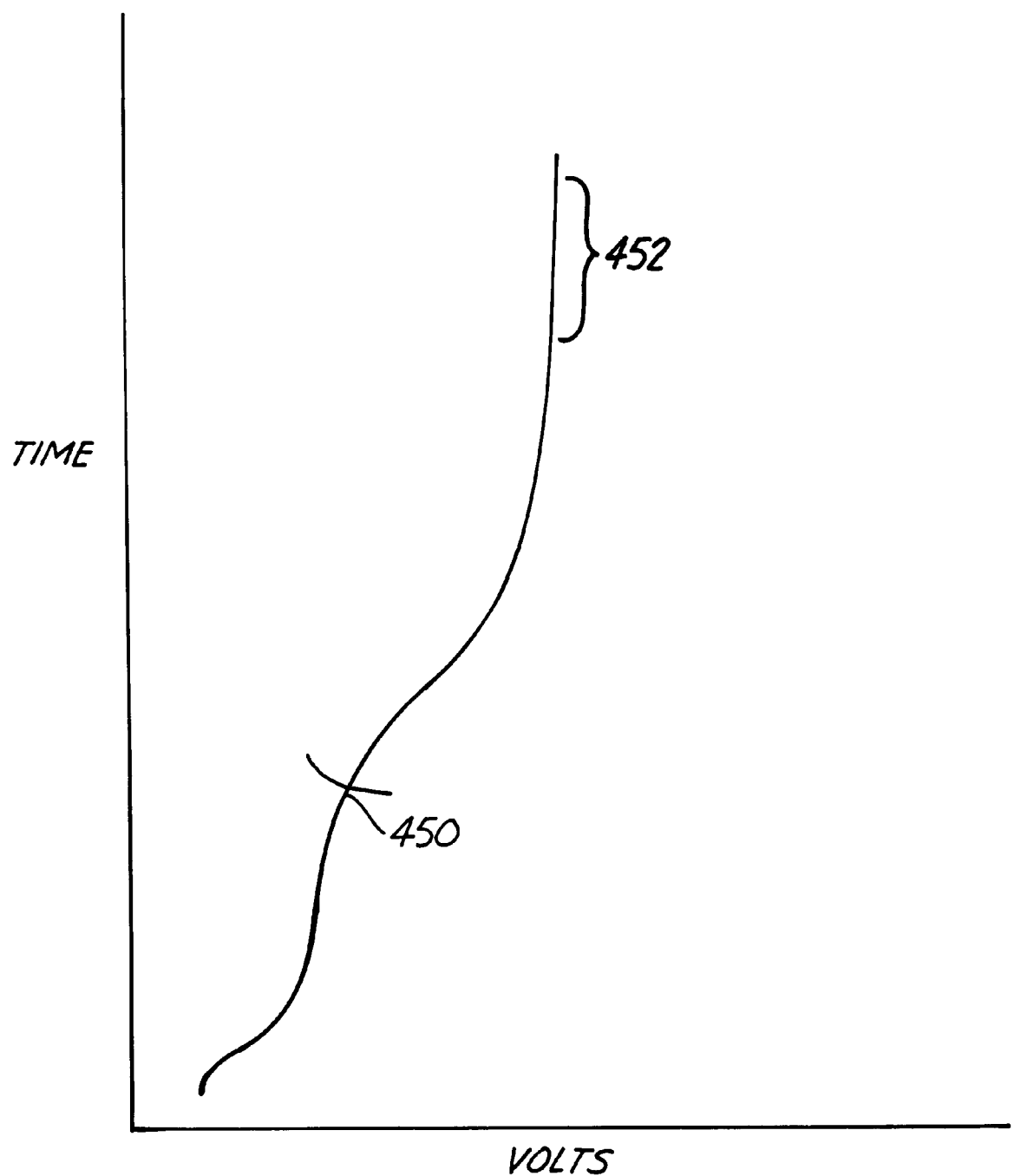
FIG. 16 illustrates a battery charging voltage curve.

First, when the average value is greater than the minimum voltage level for a fully charged battery, the program goes to block 310 to perform the first test by determining the acceleration of the voltage with respect to time. Before discussing this test, a brief description of a battery charging curve will be provided. FIG. 16 shows a battery charging voltage curve for a battery 16 being charged. The x-axis of the graph is voltage and the y-axis of the graph is time. As the amount of time that a battery 16 is increased, normally, the voltage in the battery 16 increases. However, at a certain point, the acceleration of rate at which the voltage increases begins to decrease. This inflection point 450 is a reference point in determining whether a battery is fully charged. This inflection point 450 is determined by taking the second derivative of the voltage curve with respect to time, $d^2V/dt^2$. Finally, at a certain point the voltage in the battery does not increase even though the battery continues to be charged. This portion of the curve will be referred to as the voltage saturation 452. The present invention uses this model to determine whether a battery is fully charged. Based on this model, in the present invention, the charger can make sure the battery is charged to its maximum amount. It should be noted that the present model assumes that a battery 16 is almost fully charged when the voltage of the battery 16 being charged is between a range of voltages. The present invention then supplies current to the battery for a period of time to complete the charge (i.e., increase the voltage to the voltage saturation portion of the curve shown in FIG. 16).

In order to determine the acceleration, the difference in the rate of change of voltage with respect to time, over a 5 minute period, is calculated 310. This value is actually the rate of change of slope of the battery voltage "$d^2v/dt^2$" (i.e., the acceleration of the voltage with respect to time). As the battery 16 nears full charge, $d^2v/dt^2$ goes from a negative to a positive value. When $d^2v/dt^2$ is greater than the Column G value, the battery 16 is nearing full charge. The value in Column G indicates the inflection point 450 (see FIG. 16) where the curve changes from "concave down" to "concave up" indicating that the slope is decreasing.

At this point, the amount of time that the battery has been charging to reach this inflection point 450 is used to calculate the finish charge time 312. This finish charge time is the period of time the charger 10 will continue to supply current to the battery 16 to complete the charge. The amount of time which constitutes the finish charge time depends on the user selected battery type, calculated from the Column K value.

After supplying current for the finish charge time, the difference between Von-Voff is measured 320 and compared to the value in Column D. This test checks to see if the battery 16 is sulfated (as will be described later). If the battery is sulfated, then the yellow light is illuminated 324. If the battery is not sulfated, then the green LED 44 is illuminated 326 indicating that the charge is complete. The current to the battery is shut off. The program then jumps to block 256 where the battery voltage is monitored. If the battery voltage is below 12.7V, or 6.35V (for 6V battery), then the program starts with the user selections 211 and repeats the steps which follow.

If inflection point 450 is not detected (i.e., $d^2v/dt^2$ in block 310 is less than the Table G value), then the second test which is to determine whether the battery voltage of the battery 16 is greater than upper voltage limit for a fully charged battery is checked 314. The software compares the average battery voltage to the upper voltage limit for a fully charged battery which is listed in Column H 314. If the upper limit is exceeded, then the battery is charged for the period of time defined as the finish charge time 312 as defined in Column K.

After supplying current for the finish charge time, the difference between Von-Voff is measured 320 and compared to the value in Column D. This test checks to see if the battery 16 is sulfated (which will described later). If the battery is sulfated, then the yellow light is illuminated 324. If the battery is not sulfated, then the green LED 44 is illuminated 326 indicating that the charge is complete. The current to the battery is shut off. If the battery is not sulfated, then the program then jumps to block 256 where the battery voltage is monitored. If the battery voltage is below 12.7V, or 6.35V (for 6V battery), then the program starts with the user selections 211 and repeats the steps which follow.

If the upper limit is not reached, the software performs the third test which checks the rate of change in voltage with respect to time to see if the rate of voltage change is less than the value in Column I. A small change in voltage with respect to time indicates that the battery 16 is close to being fully charged so the program jumps to block 312 to complete the charge. In this situation, the battery voltage is at the saturation level on the battery charging curve (see FIG. 16).

If the rate of change in voltage with respect to time is less than the value in Column I of the Look-Up Table, then the battery is charged for a period of time 312 as determined by Column K. After charging the battery 16 for this period of time, the difference between Von-Voff is measured 320 and compared to the value in Column D. This test checks to see if the battery 16 is sulfated (as will be described later). If the battery is sulfated, then the yellow light is illuminated 324. If the battery is not sulfated, then the green LED 44 is illuminated 326 indicating that the charge is complete. The current to the battery is shut off. If the battery is not sulfated, then the program then jumps to block 256 where the battery voltage is monitored. If the battery voltage is below 12.7V, or 6.35V (for 6V battery), then the program starts with the user selections 211 and repeats the steps which follow.

If the change in voltage with respect to time in block 316 is greater than the Column I value, then the program does a comparison of the maximum charge time against a Column J value. The maximum charge time permitted is checked in 318 against the Column J value. If the time is exceeded, then the program jumps to block 320 to measure Von-Voff. If the Von-Voff is greater than the value in Column D, block 322, then the yellow LED is illuminated 324 indicating an abnormal battery because the battery is sulfated. At this point, the charge current is shut off (i.e, no current flows through the SCRs 26 to the battery 16), and the program will not continue until the battery 16 that was unsuccessfully charged is removed, which resets the program back to block 202.

If the battery is not sulfated (i.e., Von-Voff is less than the value in Column D), then the green LED 44 is illuminated 326 indicating that the charge is complete. The current to the battery is shut off. The program then jumps to block 256 where the battery voltage is monitored. If the battery voltage is below 12.7V or 6.35V (for 6V battery), then the program starts with the user selections 211 and repeats the steps which follow.

If the maximum time limit is not exceeded then the program loops back to block 284 to continue voltage measurement and various calculations. If the maximum time is exceeded, then Von-Voff is measured 320. If the battery is sulfated, a yellow light is illuminated 324. If the battery is not sulfated, then the green LED 44 is illuminated 326 indicating that the charge is complete. The current to the battery is shut off. The program then jumps to block 256 where the battery voltage is monitored. If the battery voltage is below 12.7V, or 6.35V (for 6V battery), then the program starts with the user selections 211 and repeats the steps which follow.

d. Charging Abnormal Batteries

The above description detailed the steps performed by the processor 32 via the software during a normal charging of a depleted battery. Now, with reference to FIGS. 13 and 14, the steps performed by the processor 32 via the software are to determine whether the battery is in an abnormal condition. As stated above, the software effectively categorizes batteries 16 connected to the charger 10 in one of five categories: (1) the battery 16 is normal; (2) the battery 16 is fully charged at the time the battery is connected to the charger 10; (3) the battery 16 is sulfated; (4) the battery 16 is negatively-charged; or (5) the battery 16 is frozen. Categories (2)–(5) indicate that the battery is abnormal. The software enables the charger to monitor the battery 16 during the charging of the battery 16 or during the period that current is supplied to the battery 16 for the engine start to determine whether the battery 16 is normal or abnormal. If the battery is normal, then the charger 10 monitors the battery 16 to determine when it is fully charged. However, if the charger 10 determines that the battery 16 is abnormal, then the charger shuts off the current supply to the battery and communicates to the user that the battery is abnormal.

1. Frozen Battery

With reference to FIG. 14, the steps performed by the software to determine if a battery 16 is frozen will be described. The steps performed in detecting a frozen battery is contained in block 297. As shown in FIG. 14 and as described previously with regard to the steps performed during a normal charging, if the average voltage of the battery 16 is less than the minimum voltage level for a fully charged battery (i.e., less than the Table F value), then the processor 32 performs the following steps to determine whether the battery 16 is frozen. First, the rate of change in voltage with respect to time is compared to the valve in Column I 298. Column I lists values which indicate a rate of change in voltage with respect to time for determining whether a battery is frozen. Frozen batteries accept charge very slow. Thus, if the measured rate of change in voltage with respect to time is less than the rates listed in Column I, then the battery 16 may be frozen. If the rate of change in voltage with respect to time is less than the Column I value, then the battery 16 is charged for thirty minutes 300. A counter is incremented 302. This test is performed seven times with the battery being charged for 15 minutes 308 after each increment of the counter. If the count value is greater than 6, then the yellow LED 44 is illuminated 306 indicating that the battery is abnormal, in this case because the battery is frozen. At this point, the charge current is shut off (i.e, no current flows through the SCRs 26 to the battery 16), and the program will not continue until the battery 16 that was unsuccessfully charged is removed, which resets the program back to block 202.

2. Determination of whether the battery 16 is (a) fully charged at the time it is connected to the charger 10; (b) sulfated; or (c) negatively charged As described above with respect to FIG. 13, at block 242, the rate of change of voltage with respect to time "dv/dt" (which is based on the comparison of voltage readings taken over a five minute period 240) is determined. This measured rate is compared to the rate given in Column A of the Look-Up Table to decide if the battery voltage is increasing too quickly. If the rate of change of voltage with respect to time is greater than the value in Column A for the switch selected in block 211, which comprises the various selections 212–224, then there is an indication that the battery 16 may be in an abnormal condition (i.e., the battery 16 is (1) fully charged at the time it is connected to the charger, (2) sulfated, or (3) negatively charged.

With reference to FIGS. 13 and 15, the sequence of events that follow detection of an abnormal battery condition (i.e., when the rate of change of voltage with respect to time is greater than the value in Column A of the Look-Up Table) will now be described. With reference to FIGS. 13 and 15, the steps performed by the software when the battery 16 is (1) fully charged at the time it is connected to the charger 10; (2) sulfated; or (3) negatively charged are as follows.

a. Battery Fully Charged When Connected To Charger

The steps encompassed by block 239 will be performed if the battery 16 is fully charged at the time it is connected to the charger 10. In a fully-charged battery, the rate of change in the battery voltage with respect to time over the 5 minute period the charger 10 monitored the voltage will be greater than the value given in Column A of the Look-Up Table (FIG. 15).

The processor 32 also determines if the average voltage (Vavg) in the battery 16 is between the high and low voltage values given in Column B of the Look-Up Table 246. These values in Column B represent a range of voltages that would be considered a fully-charged battery.

In a fully-charged battery, the average voltage should fall within the range given in Column B of the Look-Up Table. Then the battery 16 is charged for an additional 5 minutes 248 so that the rate of change of voltage with respect to time may be calculated again. At this point, the processor 32 determines whether the rate of change of voltage with respect to time is greater than zero 250. This test determines if the voltage is still increasing with respect to time. While a battery within the voltage range of Column B indicates a fully-charged battery, a battery 16 can still accept a certain amount of charge. This concept is similar to topping of a gas tank in a car at the filling station. Consequently, in block 250, the processor is determining if the voltage is still increasing with respect to time. With respect to block 250, if the change in voltage with respect to time is less than zero, then the program continues to block 274, where the steps for determining if the battery is negatively charged or if the battery is sulfated will be performed (which will be described later).

If the rate of change in voltage with respect to time is greater than zero, then the battery voltages with the charger on and with the charger off "Von-Voff" are measured 252. The difference between two voltage measurements taken 5 seconds apart is compared to the values in Column D of the Look-Up table. If the difference between Von-Voff is not greater than the value in Column D of the Look-Up table, then the battery was fully charged at the time it was connected to the charger 10. Column D relates to the amount of voltage drop in a battery when the current is shut off for five seconds. This test is testing for a sulfated battery (which will be described later). This test is done here to check that the battery is not sulfated. At this point the green "charge complete" LED 44 is illuminated 254. The current to the battery 16 is shut off. The charger 10 continues to monitor the battery voltage 256. If the voltage drops below the value in block 258, which corresponds to the selection made by the user in 211 (12.7for 12 volt batteries 6.35for 6 volt batteries) then the charger turns back on, using the previous switch selection from block 211 and moves to block 236 resetting all times and voltage measurements. With respect to block 252, if the Von-Voff value is greater than the value in Column D, then the program continues to block 274, w here the steps for determining if the battery is negatively charged or if the battery is sulfated will be performed (which will be described later).

(b) Determination of a Sulfated Battery

The following describes the steps performed by the processor 32 to determine whether the battery 16 is sulfated. There are two separate tests to determine whether a battery is sulfated. The first test is only performed when the rate of change of the voltage with respect to time is greater than the value in Column A of the Look-Up Table 242 but the value of the voltage of the battery is not within the range given in Column B of the Look-Up table 246. The second test is performed (1) when the first test does not indicate a sulfated battery; or (2) as a precaution, before the charger indicates that the battery is completely charged (i.e., block 252 in FIG. 13 and block 320 in FIG. 14).

In the first test, the program compares the voltage of the battery 16 to the maximum allowed charge voltage in Column C of the Look-Up Table 260. Column C of the Look-Up Table (see FIG. 15) lists maximum voltage levels a fully charged battery would reach. If the voltage level in the battery 16 is greater than the voltage value listed in Column C of the Look-Up Table, then the battery is sulfated. This condition occurs when the plates in the battery 16 are acting as a capacitor. If the voltage in the battery 16 exceeds the voltage listed in Column C, then the yellow check battery LED is illuminated 262. At this point, the charge current is shut off (i.e, no current flows through the SCRs 26 to the battery 16), and the program will not continue until the battery 16 that was unsuccessfully charged is removed, which resets the program back to block 202.

However, if the voltage at the battery 16 did not exceed the maximum voltage listed in Column C, then the processor 16 performs a second test to determine if the battery 16 is sulfated. The steps performed for the second test are shown in block 263. To perform this test, the battery 16 is charged for 5 minutes 264. Next, the processor calculates Von-Voff, which is the difference between two voltage measurements taken five seconds apart. The Von-Voff measurement is compared to the values in Column D.

If the value is greater than the Column D value, then there is an indication that the battery may be sulfated. This test is performed eight times. A loop counter is incremented 268, recording the number of times Von-Voff is greater than the Column D value. If the Von-Voff values continue to be greater than the value in Column D of the Look-Up Table so that the loop counter (i.e., counter 1) is incremented to nine, the value in block 270, then the program causes the yellow LED 44 to be illuminated. This yellow light indicates that the battery is abnormal, in this case sulfated. At this point, the charge current is shut off (i.e, no current flows through the SCRs 26 to the battery 16), and the program will not continue until the battery 16 that was unsuccessfully charged is removed, which resets the program back to block 202. If the value is less than the value in Column D, then the battery is accepting a charge and the program goes to block 240 where normal charging continues.

(c) Determination of Whether a Battery is Negatively Charged

With reference to FIGS. 13 and 14, the tests for determining if a negatively charged battery has been connected to the charger 10 will be described. It should be noted that the same test for a negatively charged battery 16 is conducted in two separate parts of the software. In FIG. 13, the test to determine whether the connected battery is a negatively charged battery is conducted in conjunction with the second test for a sulfated battery. Whereas in FIG. 14, during a normal charging of a battery, the test to determine whether the connected battery is a negatively charged battery is done at block 286. The steps for determining whether a battery is negatively-charged is encompassed in Block 273 in both FIGS. 13 and 14. For clarity, since the steps i n both figures are the same, the steps for determining whether a battery 16 is negatively charged will be described with respect to FIG. 13.

The processor 32 determines if the battery 16 has been negatively charged by performing the following steps. First, the battery 16 is charged for 10 minutes 274. After the ten minute charge 274, the change in voltage with respect to time is calculated and compared to the values in Column E 276 (it should be noted in FIG. 14, this step is shown as two steps in blocks 286 and 296). Column E of the Look-Up Table (see FIG. 15) lists values for rate of change in voltage with respect to time. If the rate at which the voltage is changing with respect to time is less than the values listed in Column E, then the battery 16 may be negatively charged. This test (i.e., the ten minute charge 274, the measurement of dv/dt, and comparing dv/dt to a value in Column E, 276) are performed three times 278, 280. If dv/dt is less than the Column E value, then the yellow light is illuminated 282 indicating that the battery 16 is abnormal, in this case, because the battery 16 is negatively charged. At this point, the charge current is shut off (i.e., no current flows through the SCRs 26 to the battery 16), and the program will not continue until the battery 16 that was unsuccessfully charged is removed, which resets the program back to block 202.

Referring to FIG. 13, after the ten minute charge 274, if there is n o indication that the battery 16 is negatively charged (i.e., the change in voltage with respect to time is greater than the value in Column E), then the software performs the second test for determining if a battery is sulfated as described previously. Also, as described previously, with regard to FIG. 14, if there is no indication that the battery 16 is negatively charged, the test is performed for determining if the battery voltage has exceeded the minimum voltage level for a fully charged battery.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A battery charging device adapted to be connected to a battery having a positive and a negative terminal for supplying a direct current to the positive terminal, comprising:

(a) an alternating current supply means connected to a power supply for providing alternating current;

(b) a charge current supply controller connected to the alternating current supply and adapted to be connected to the positive and negative terminals of the battery for supplying direct current to the positive terminal of the battery;

(c) a polarity sensing circuit in communication with the terminals of the battery to detect the polarity of the terminals and generate an output indicating the polarity of the terminals, the polarity sensing circuit being operable for a battery voltage that is insufficient to activate a current-limiting, polarity detection circuit; and (d) a processor connected to the polarity sensing circuit and the charge current supply controller which enables the charge current supply controller to provide direct current to the positive terminal of the battery based on the output from the polarity circuit.

2. The battery charging device of claim 1, wherein the polarity sensing circuit which detects polarity of the terminals attached to a battery having a voltage greater than zero volts comprises a first comparator having a positive input and a negative input, the positive input being in communication with the battery and the negative input being connected to a positive power supply; and a second comparator having a positive input and a negative input, the positive input being connected to a negative power supply and the negative input being in communication with the battery.

3. The battery charging device of claim 2, wherein the negative input of the first comparator and the positive input of the second comparator are each connected to their respective power supply through a resistor, whereby the resistor is used to set the sensitivity of the comparator.

4. The battery charging device of claim 3, wherein the positive power supply is provided by the internal power supply circuit.

5. The battery charging device of claim 4, wherein the negative power supply is provided by the negative voltage power supply.

6. The battery charging device of claim 1, wherein the polarity sensing circuit is capable of detecting the polarity of a battery having a voltage that falls within the range of 0 to 5 volts.

7. A battery charging device adapted to be connected to a battery having a positive and a negative terminal for supplying a direct current to the positive terminal, comprising:

(a) an alternating current supply means connected to a power supply for providing alternating current;

(b) a charge current supply controller connected to the alternating current supply and adapted to be connected to the positive and negative terminals of the battery for supplying direct current to the positive terminal of the battery;

(c) a polarity sensing circuit in communication with the terminals of the battery to detect the polarity of the terminals and generate an output indicating the polarity of the terminals, wherein the polarity sensing circuit includes (1) a first comparator having a positive input and a negative input, the positive input being in communication with the battery and the negative input being connected to a positive power supply, (2) and a second comparator having a positive input and a negative input, the positive input being connected to a negative power supply and the negative input being in communication with the battery; and (d) a processor connected to the polarity sensing circuit and the charge current supply controller which enables the charge current supply controller to provide direct current to the positive terminal of the battery based on the output from the polarity sensing circuit.

8. A battery charging device adapted to be connected to a battery having a positive and a negative terminal for supplying a direct current to the positive terminal, comprising:

(a) an alternating current supply connected to a power supply for providing alternating current;

(b) a charge current supply controller connected to the alternating current supply and adapted to be connected to the positive and negative terminals of the battery for supplying direct current to the positive terminal of the battery;

(c) a polarity sensing circuit in communication with the terminals of the battery to detect the polarity of the terminals and generate an output indicating the polarity of the terminals, wherein the polarity sensing circuit has a high input impedance for detecting the polarity of a substantially discharged battery; and (d) a processor connected to the polarity sensing circuit and the charge current supply controller to enable the charge current supply controller to provide direct current to the positive terminal of the battery based on the output from the polarity sensing circuit.

9. The battery charging device of claim 8, wherein the polarity sensing circuit comprises:

a first comparator having a positive input and a negative input, the positive input being in communication with the battery and the negative input being connected to a positive power supply; and a second comparator having a positive input and a negative input, the positive input being connected to a negative power supply and the negative input being in communication with the battery.

10. The battery charging device of claim 9, wherein the negative input of the first comparator and the positive input of the second comparator are each connected to their respective power supply through a resistor, whereby the resistor is used to set the sensitivity of the comparator.

11. The battery charging device of claim 10, wherein the positive power supply is provided by an internal power supply circuit.

12. The battery charging device of claim 11, wherein the negative power supply is provided by the negative voltage power supply.

* * * * *